United States Patent [19]

Petryszyn

[11] 4,445,168
[45] Apr. 24, 1984

[54] APPARATUS AND METHOD FOR MICRO-COMPUTER CONTROL OF LUBRICATION SYSTEM

[75] Inventor: William W. Petryszyn, Cleveland, Ohio

[73] Assignee: Houdaille Industries, Inc., Fort Lauderdale, Fla.

[21] Appl. No.: 276,961

[22] Filed: Jun. 24, 1981

[51] Int. Cl.³ .................. G06F 15/46; G05B 19/10
[52] U.S. Cl. .................. 364/140; 364/505; 184/6.1; 184/6.4; 184/6.14
[58] Field of Search .................. 364/140–143, 364/184, 185, 505, 171, 509, 510; 184/6, 6.1, 6.4, 6.14

[56] References Cited

U.S. PATENT DOCUMENTS

| | | | |
|---|---|---|---|
| 3,674,112 | 7/1972 | Roberts | 184/6.1 |
| 3,707,203 | 12/1972 | Roberts | 184/6.4 |
| 3,856,114 | 12/1974 | Zankl | 184/6.1 |
| 3,882,305 | 5/1975 | Johnstone | 364/551 |
| 4,129,901 | 12/1978 | Masuda | 364/184 |
| 4,215,409 | 7/1980 | Strowe | 364/185 |
| 4,326,603 | 4/1982 | Darrow et al. | 184/6.1 |
| 4,365,289 | 12/1982 | Small et al. | 364/143 |

OTHER PUBLICATIONS

'Microcomputer Controlled Precision Pneumatic Pressure Generator', by Ellis et al., Autotestcon '76 Conference, Nov. 1976.

Primary Examiner—Jerry Smith
Assistant Examiner—William G. Niessen
Attorney, Agent, or Firm—Hill Van Santen, Steadman & Simpson

[57] ABSTRACT

A novel apparatus and method for micro-computer control of lubrication systems which utilizes a micro-computer that receives input signals from a lubrication station indicative of the level of lubricant, the pressure of the lubricant, the number of lube cycles and/or strokes of the machine or lubricating system which are furnished to the micro-computer that also receives inputs from program, monitor, system cycle and control switches and supplies output signals so as to actuate the lubricating system on a periodic predetermined base. In addition, the micro-computer produces fault signals so as to protect the machine or machines being lubricated in the event a fault occurs.

15 Claims, 21 Drawing Figures

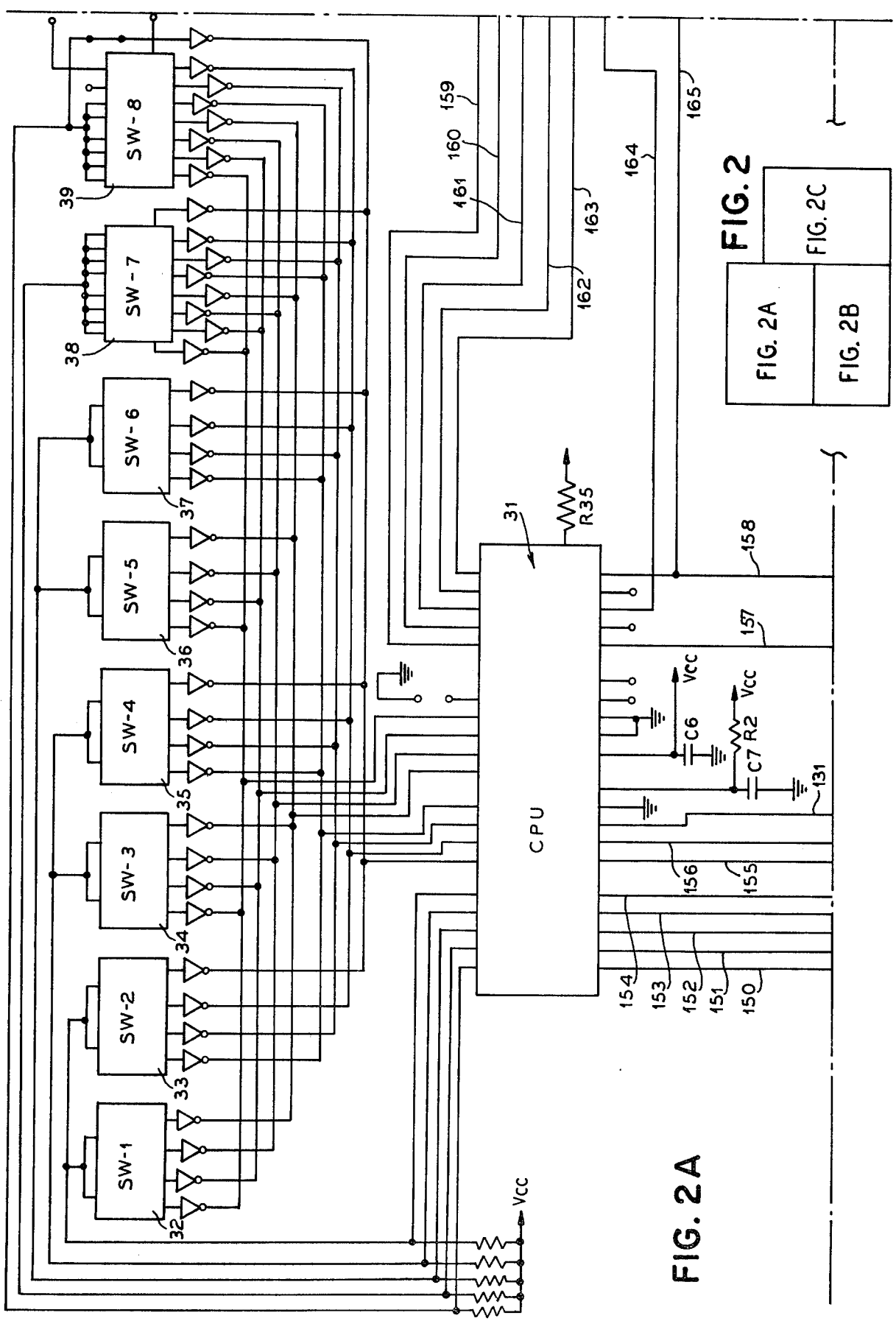

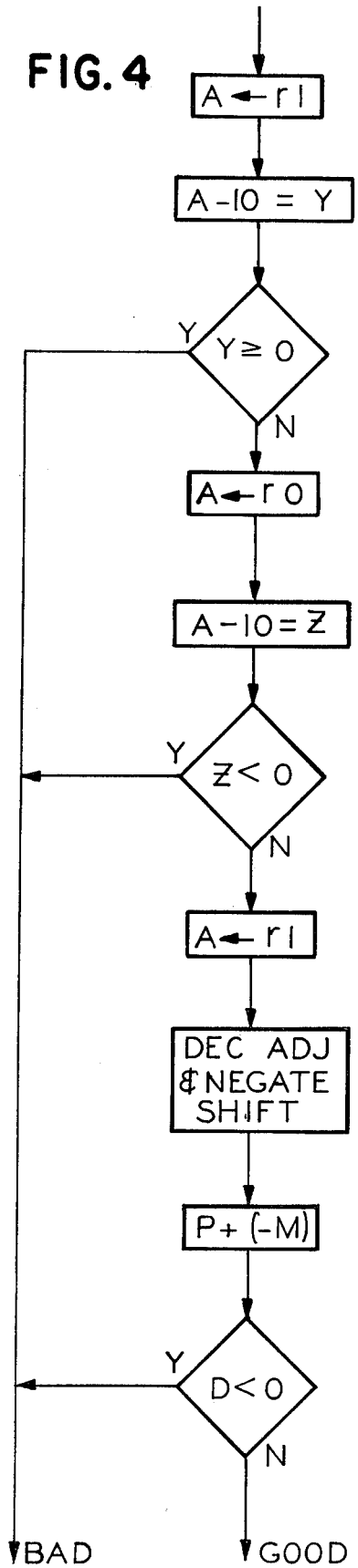
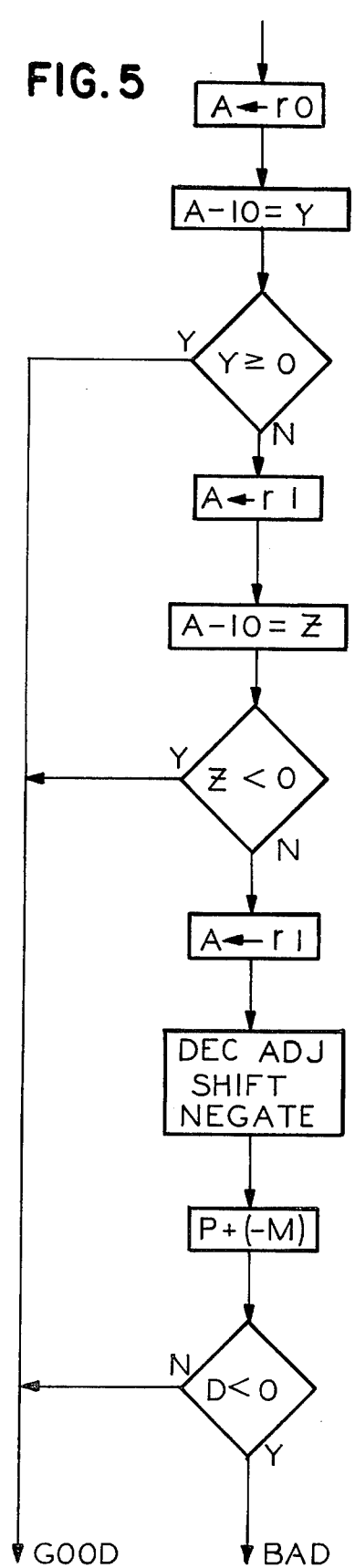

APPARATUS AND METHOD FOR MICRO-COMPUTER CONTROL OF LUBRICATION SYSTEM

BACKGROUND OF THE INVENTION

1. Field of the Invention

This invention relates in general to lubricating systems and in particular to a novel micro-computer controlled system.

2. Description of the Prior Art

Machine tools and other equipment require periodic lubrication based on either a time cycle, a stroke cycle or other routine. Also, many machines must be prelubed before the machine is first energized. Previously, automatic lubrication has utilized a time basis wherein the lubrication occurs periodically at present time or, alternatively, machines have been lubricated after a predetermined number of cycles of operation. Assignee of the present invention owns U.S. Pat. Nos. 3,127,954 and 3,707,203 which describes prior art lubrication systems and the disclosures in such patents are hereby incorporated by reference.

For example, FIG. 1A illustrates a lubrication system with a controller whereas the controller would program lubrication intervals in which it would activate the load which is a pump or solenoid. Upon such activation a lubricant would be dispensed through the main line into a single main inlet of the distributor and is discharged in predetermined sequence through a number of outlets to a number of branch lines, the distributor having a plurality of plungers each of which travels back and forth in the course of each cycle of operation of the distributor.

Upon a complete cycle of this distributor, the cycle switch opens and closes its contacts for one complete cycle, this signals the controller which terminates the pump and indicates a normal condition. As stated, during this lubrication period, the controller is monitoring the cycle switch to insure that it has completed its cycle. If for instance, one of the branch lines (which provides lubricant to a bearing) becomes crushed, the cycling of the distributor would be interrupted. Therefore, the cycle did not complete within its monitored period hence the controller would initiate a fault signal.

The above assures that lubricant did flow to each and every outlet of the distributor.

SUMMARY OF THE INVENTION

The present invention relates to a micro-computer controlled lubrication system which includes a micro-computer that receives a plurality of input signals from the lubricating system and machine being lubricated and provides an output to the lubricating system so as to automatically lubricate the machine and receive feedback signals and in which the computer monitors within a certain parameter. The micro-computer receives inputs from program, monitor and system cycle switches and also from a number of control switches for setting various parameters and automatically produces the lubrication control signals in response to the various inputs and in addition produces fault control signals so as to protect and turn the machine off in the event of certain conditions.

The micro-computer system of the invention has great flexibility in that it can be easily and simply set for different conditions such as time control or stroke control of the program and monitor sections. The program lockout feature is used so that in the event a fault occurs it may be opted to have the controller discontinue further lubrication cycles and shut the machine down (via the fault relay) or it may be optioned to continuously program lubrications periods despite the fault conditions. The prelube function allows the controller to automatically program a lubrication period when power is applied or it may be option to wait until the end of the first program period to initiate the first lubrication cycle. The prelube option is bypassed by the controller under certain option conditions, such as programming in the stroke mode, or by use of the times 10 or time 100 program time multiplier.

The unit is designed to respond to 110 or 230 volt power supply by selection of the proper jumpers and also the computer's time base can be selected to operate off 50 or 60 cycle power.

The output can be selected so as to provide pulsed output which would be necessary for non-self cycling pumps. An optional continuous output can be selected for use with air barrel pumps, air driven pumps and electric driven pumps, bulk header solenoid valves or machine cycled pumps.

The fault relay can be either energized upon a fault or could be de-energized upon a fault.

With solenoid failure feature selected, the computer senses if lubricant is flowing in the system when the computer is not energizing the output hence indicating an inoperative bulk header solenoid valve, energizing its indicator and providing an output fault.

For the low level interlock it may be opted to create a fault in the controller (hence activating the fault relay) or it may be opted to just illuminate an indicator when a low level signal is received. A similar operation occurs for sensed high pressure in the lube system.

Some unique features of this invention are that the output power of the controller is continuously monitored in the event a fuse blows or an inoperative output, the controller will indicate a particular error code and activate the fault relay.

The program and monitor switches are checked at the initiation of a new program to check if this data is computable such that the program setting must be greater than the monitor setting and neither may be equal to zero. This is also computed after one complete program period in the event that the program or monitor were set to dissimilar modes such as time or stroke. In this case, computation of the stroke duration in time is compared with the time duration to insure that the monitor setting is not greater than the program setting. Unique error codes are given for each of the above. Optical couplers are used so that alternating current can be used on all external control switches. The optical couplers provide a 1500 volt isolation between the AC line and the DC logic. Through the use of a micro-computer to provide many different programming routines, time and machine stroke ranges and the options outlined above, it is possible to allow a single controller to program and monitor lubrication in many different applications by selection of the required features.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 2 illustrates the arrangement of drawing FIGS. 2A, 2B and 2C;

FIGS. 2A through 2C comprise a block electrical schematic diagram of the micro-computer according to the invention;

FIG. 4 illustrates the program data check monitor multiplier greater than the program multiplier;

FIG. 5 illustrates the program data check with the program multiplier being greater than the monitor multiplier;

DESCRIPTION OF THE PREFERRED EMBODIMENTS

Figure 1:
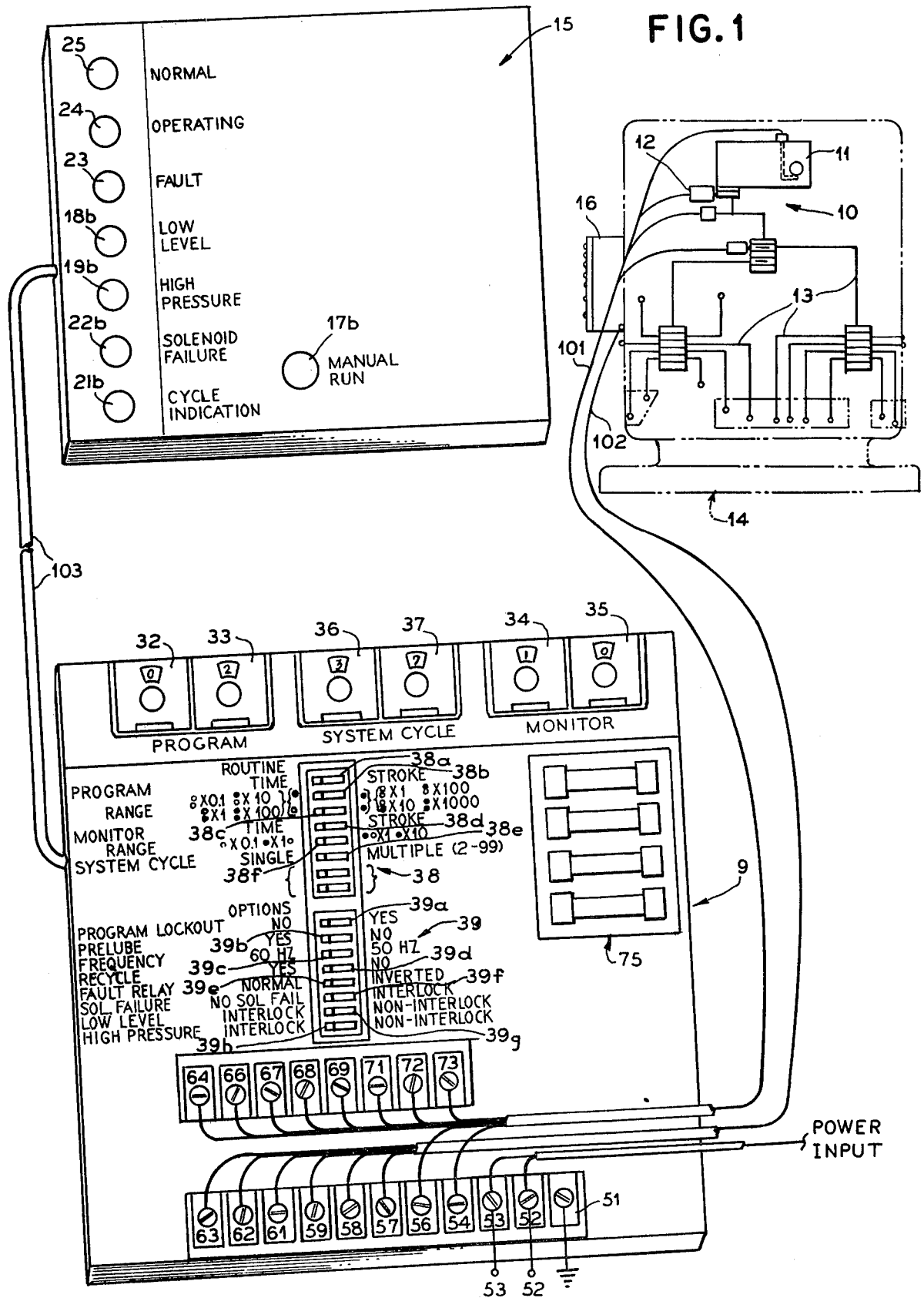
FIG. 1 is a block diagram illustrating the micro-computer lubrication control system of the invention.
Figure 1A:
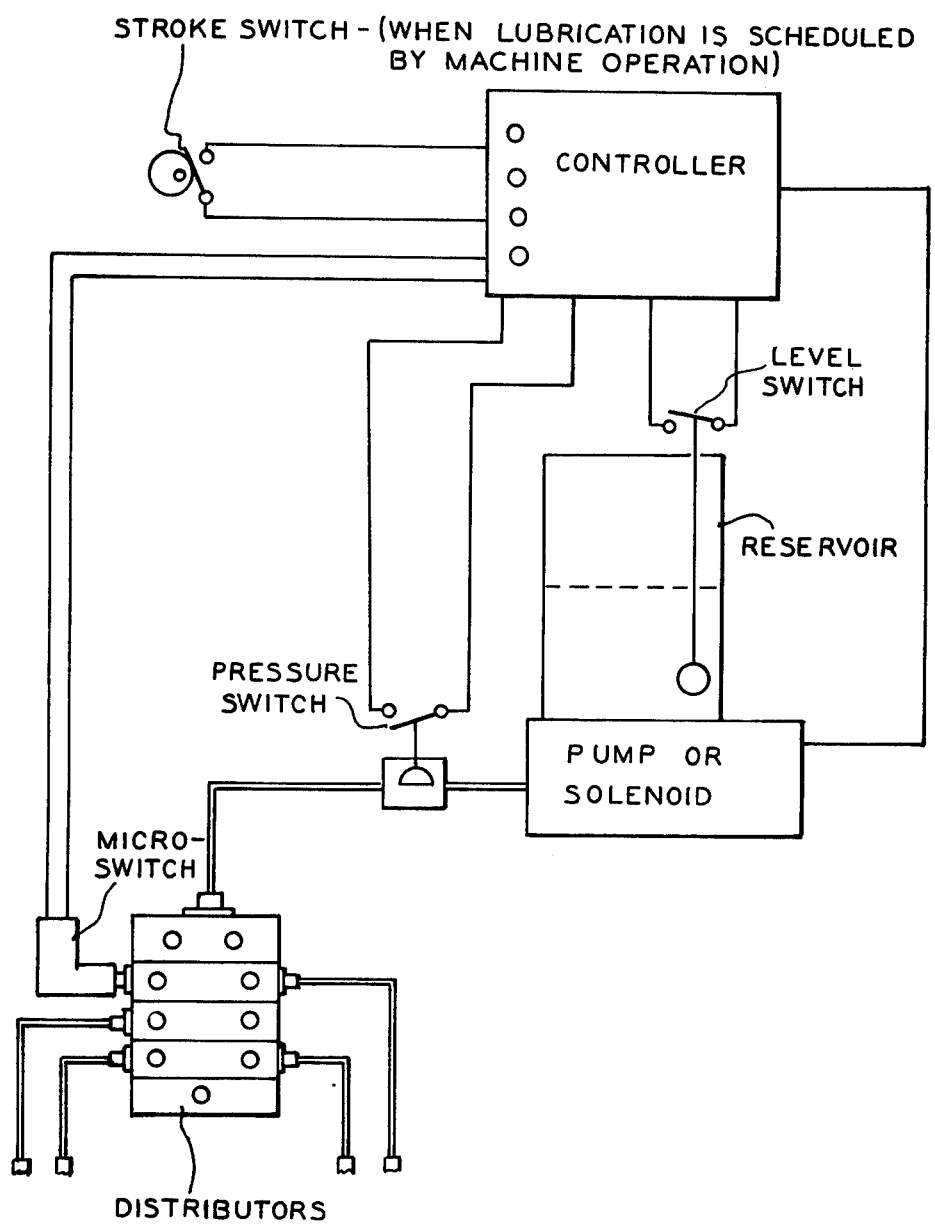
FIG. 1A is a block diagram of a lubricating system.

FIG. 1 illustrates the micro-computer lubrication controller of the invention including a housing 9 which includes the micro-computer and which is connected by cables 101 to a lubricating system 10 including a pump 12 and reservoir 11 with suitable distributor valves and lubricating conduits 13 for lubricating an operating machine 14 at various points. Machine control means (fault relay contacts) 16 may be connected in the control system of the operating machine 14 to protect it as, for example, to stop operation of the machine in the event a fault occurs.

An indicator 15 is connected by a suitable cable 103 to the housing 9 and includes indicator lights such as a normal indicator light 25, an operating light 24, a fault indicator light 23, a low level light 18b, a high pressure light 19b, a solenoid failure light 22b, a cycle indication light 21b and a manual run switch 17b.

The housing 9 carries a pair of program switches 32 and 33 which can be thumb switches that can be rotated to different positions (1–99) for establishing different programs in the system. A pair of system cycle switches 36 and 37 are also mounted in the housing 9 and allow different system cycles (1–99) which occur within a single monitor period, to be set by moving the thumb switches 36 and 37. A pair of monitor switches 34 and 35 are also mounted in the housing 9 and can be set with suitable thumb switches to establish different monitoring conditions (1–99). A number of control switches 38 and 39 can be set to change the control functions of the system. For example, switch 38a allows either a time or stroke routine to be utilized in the program. Switches 38b and 38c allow different multipliers to be set for the program ($\times 0.1$, $\times 1$, $\times 10$, $\times 100$ for time program, $\times 1$, $\times 10$, $\times 100$, $\times 1000$ for stroke program). Switch 38d allows the monitor switches to be set to either time or stroke and switch 38f allows the monitor range to be varied, ($\times 0.1$, $\times 1$ for time monitor, $\times 1$, $\times 10$ for stroke monitor). Switch 38e sets the cycle switches to a single or multiple cycle. Switches 39a through 39h provides for various options which can be set by the two position switches. Fuses 75 are provided in the system and can be easily changed on the front case of the housing 9 if one of the fuses blows. A pair of terminal blocks provide inputs and outputs 51, 52, 53, 54, 56, 57, 58, 59, 61, 62, 63, 64, 66, 67, 68, 69, 71, 72 and 73 which are connected by the cables 101 and 102 to the lubricating system 10 and to the machine 14 and machine control 16.

Figure 2B:
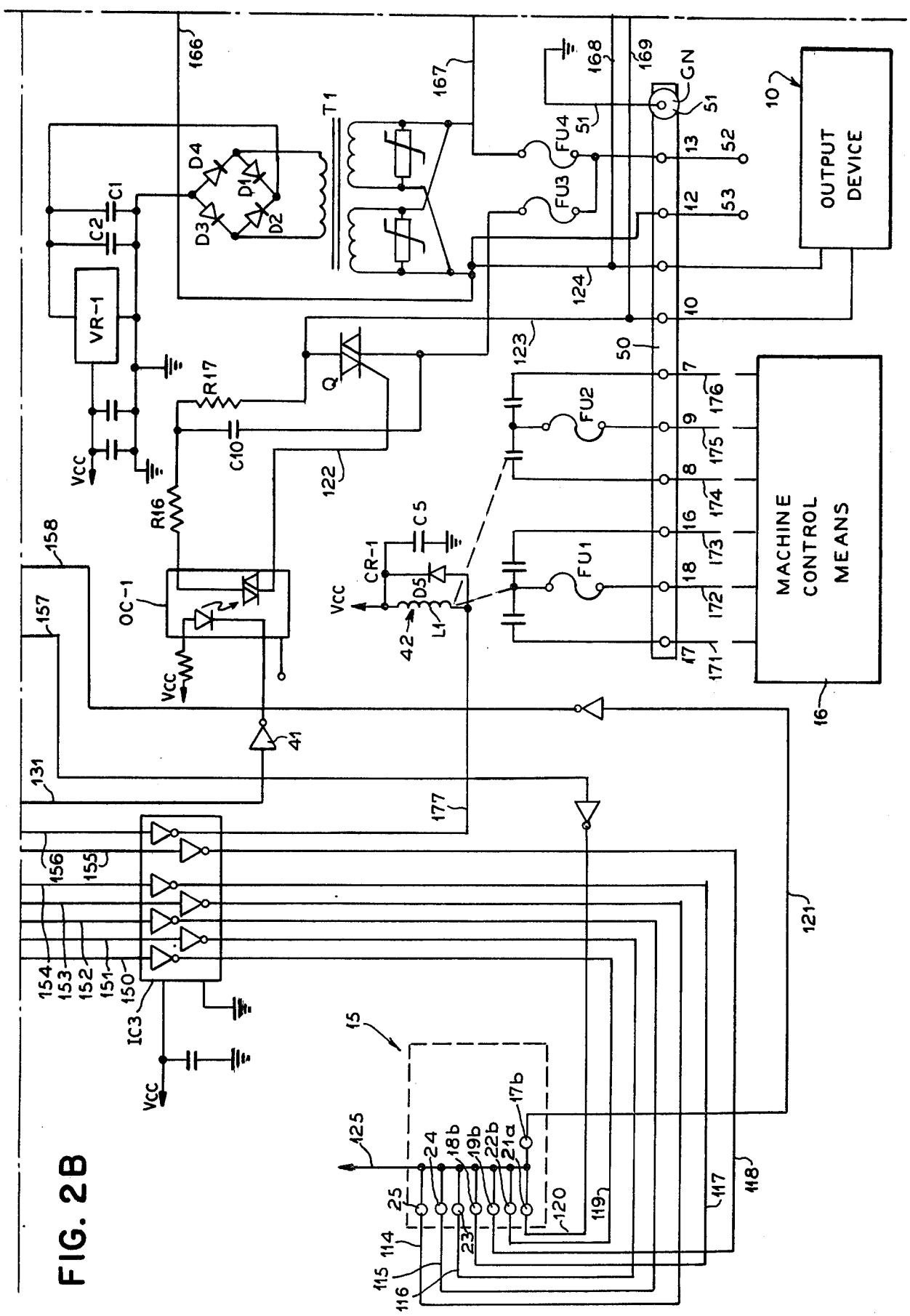
Figure 2C:
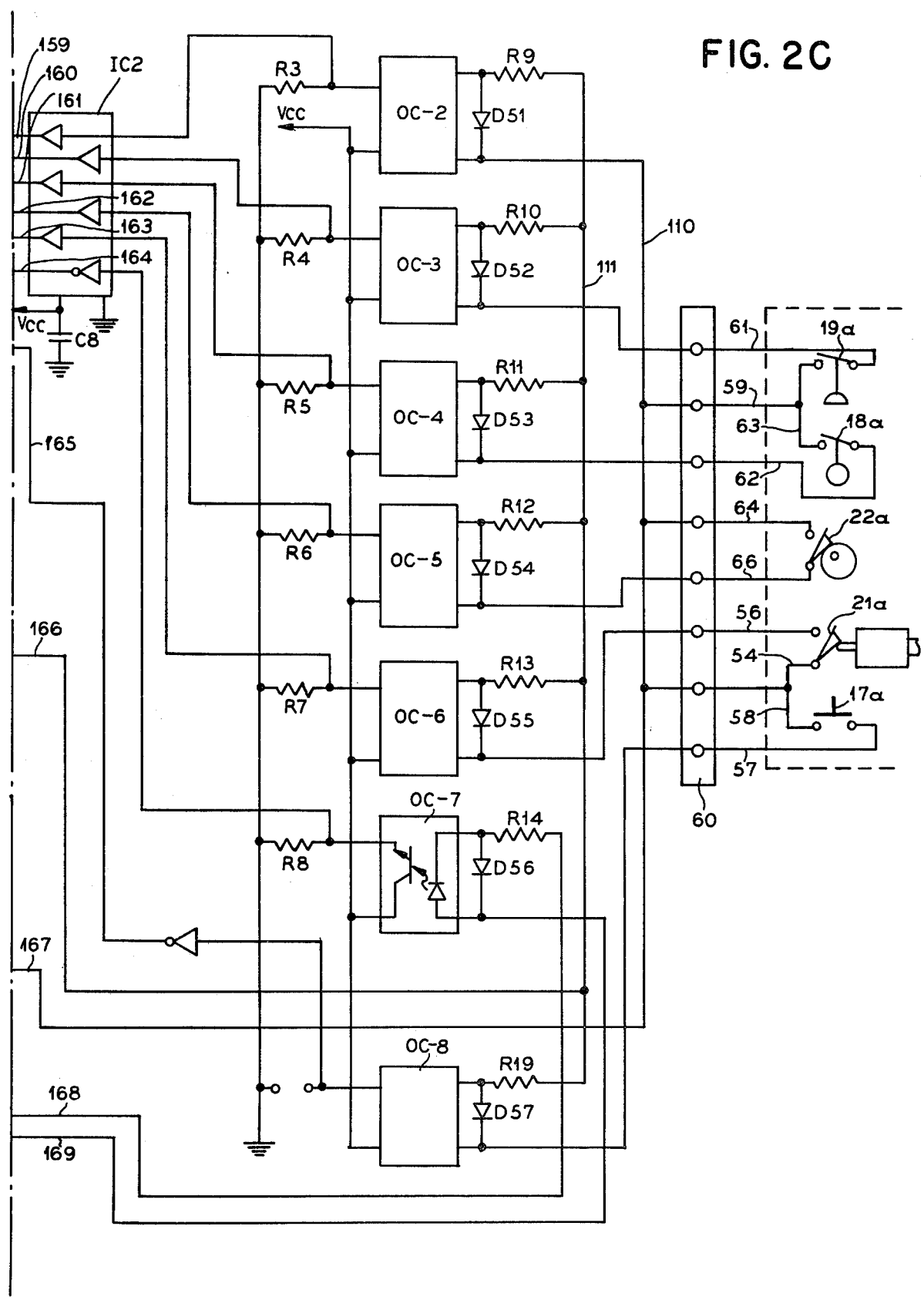

FIGS. 2A, 2B and 2C comprise electrical schematic block diagrams of the micro-computer system of the invention. The inputs to the system can comprise a high pressure switch 19a and a low level switch 18a which monitors the level of the lubricant. A stroke switch 22a can be operated by a cam on the machine 14 so as to provide the stroke information to the system. A cycle switch 21a is actuated by a plunger from a distribution block. For example, a manual start switch 17a can be momentarily closed by an operator to start manually the lube cycle. The micro-computer 31 receives inputs from these input devices. Lead 61 of switch 19a is connected to integrated circuit OC3. Lead 62 of switch 18a is connected to integrated circuit OC4. Lead 66 of switch 22a is connected to integrated circuit OC5. Lead 56 of switch 21a is connected to integrated circuit OC6. Leads 59, 63, 64 and 54 and 58 are connected to lead 110 which is connected to integrated circuit OC2. Lead 57 is connected to lead 167 which connects it to one of the power input terminals 52. The integrated circuits OC2, OC3, OC4, OC5, OC6 and integrated circuit OC7 which are light coupler isolators and provide inputs to integrated circuit IC2 which supplies inputs to the micro-computer 31 on leads 159–165. The program switches 32 and 33 are connected through inverters to inputs of the micro-computer 31. The monitor switches 34 and 35 are connected through inverters to the micro-computer 31. System cycle switches 36 and 37 are connected to the micro-computer 31 through inverters. The control switches 38 and 39 are connected through inverters to the micro-computer 31.

The indicator 15 is connected to the output leads 150–157 of the micro-computer 31 through an integrated circuit IC3 which is connected to the indicator lights 25, 24, 23, 18b, 19b, 22b, 17b and 21b of the indicator by leads 114 through 121. Power is applied to the indicator on lead 125. Lead 121 is connected to the micro-computer 31 through an inverter and lead 158 from the manual run push button 17b.

Lead 131 extends from the micro-computer 31 through an inverter 41 and through a light isolating integrated circuit OC1 which has an output connected to lead 122 which is connected to the trigger of a thyristor Q1. Lead 123 extends from the thyristor to the output device 10 so as to supply the output of the micro-computer to control the lubricating system. Lead 124 is connected to the second output terminal of the system and to the output device 10. Power is applied between terminals 52 and 53 and a grounded terminal 51. Fuses FU3 and FU4 are connected to the power input terminals and a transformer and rectifiers D1 through D4 supply driving power Vcc as indicated.

In operation, the program, monitor, system cycle and control switches 32, 33, 34, 35, 36, 37, 38 and 39 are set to establish the desired program for lubricating the machine. The program is initiated by applying power to the unit or by pushing the manual run button or by the completion of a previous lubrication period. If a prelube is desired, to provide a lubrication when the machine 14 is first energized this option is selected. The micro-computer will receive the inputs from the various monitoring switches such as 19a, 18a, 22a, 21a and will periodically supply outputs on leads 123 and 124 to energize the lubricating system 10 so that machine 14 will be lubricated. If a fault occurs which indicates that something is wrong with the system, the machine control 16 will be controlled through the leads 171 through 176 which are energized by the fault relay 42 which has a relay winding L1 and receives an input on lead 177 which is connected through the integrated circuit IC3 to lead 156 which is connected to the micro-computer 31. The machine control means 16 might be connected to terminate operation of the machine 14 or they might allow the machine to complete the the existing cycle before stopping it.

In a system constructed according to the invention, the following components were used:

| | |
|---|---|
| Micro-computer 31 | type 3870 |
| Integrated circuit IC3 | type MC-1411P |
| Circuit OC1 | type MOC-3009 |
| VR-1 | type LM309K |
| Integrated circuit IC2 | type MC-14584BCP |
| Circuits OC-2-OC8 | type MOC-119 |
| Capacitor C1 | 2200 microfarad |
| Capacitor C2 | 22 microfarad |
| Capacitor C3 | 1.0 microfarad |
| Capacitor C4 | 0.22 microfarad |
| Capacitor C5 | 0.047 microfarad |
| Capacitor C6 | 0.047 microfarad |
| Capacitor C7 | 24 picofarad |
| Capacitor C8 | 0.047 microfarad |
| Resistors R9, R10 R11, R12, R13, R14, R19 | 39K ohms |
| Resistors R3, R4 R5, R6, R7 and R8 | 10K ohms |
| Resistor R16 | 180 ohms |
| Resistor R15 | 220 ohms |
| Resistor R35 | 10K ohms |

It is to be noted that in FIGS. 2A through 2C that leads passing from one sheet to the next are numbered with the same numbers as, for example, leads 150 through 158, and leads 159 through 169.

Figure 3A:
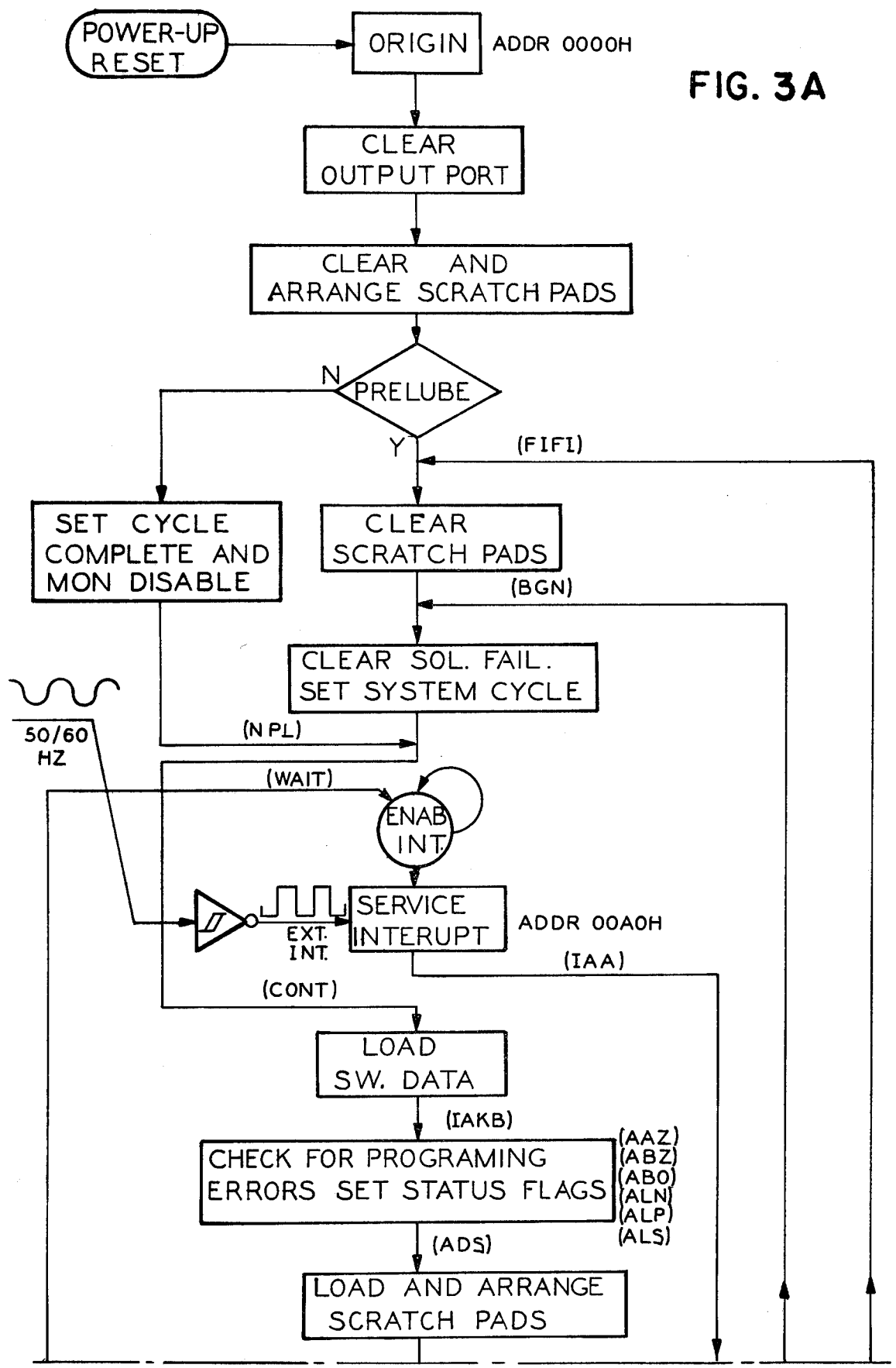
FIGS. 3A, 3B and 3C comprise the overall functional diagram for the micro-computer.
Figure 3B:
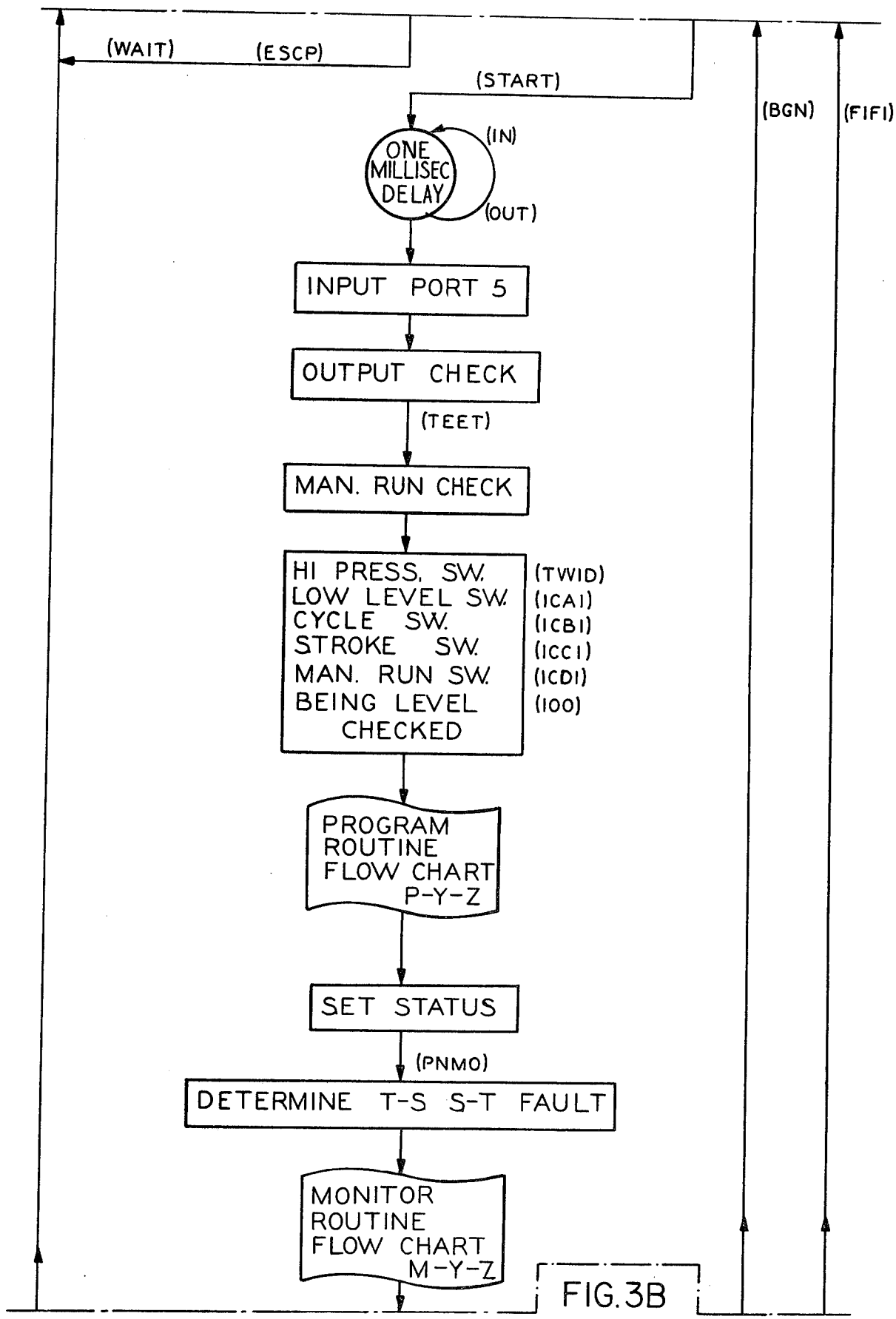
Figure 3C:
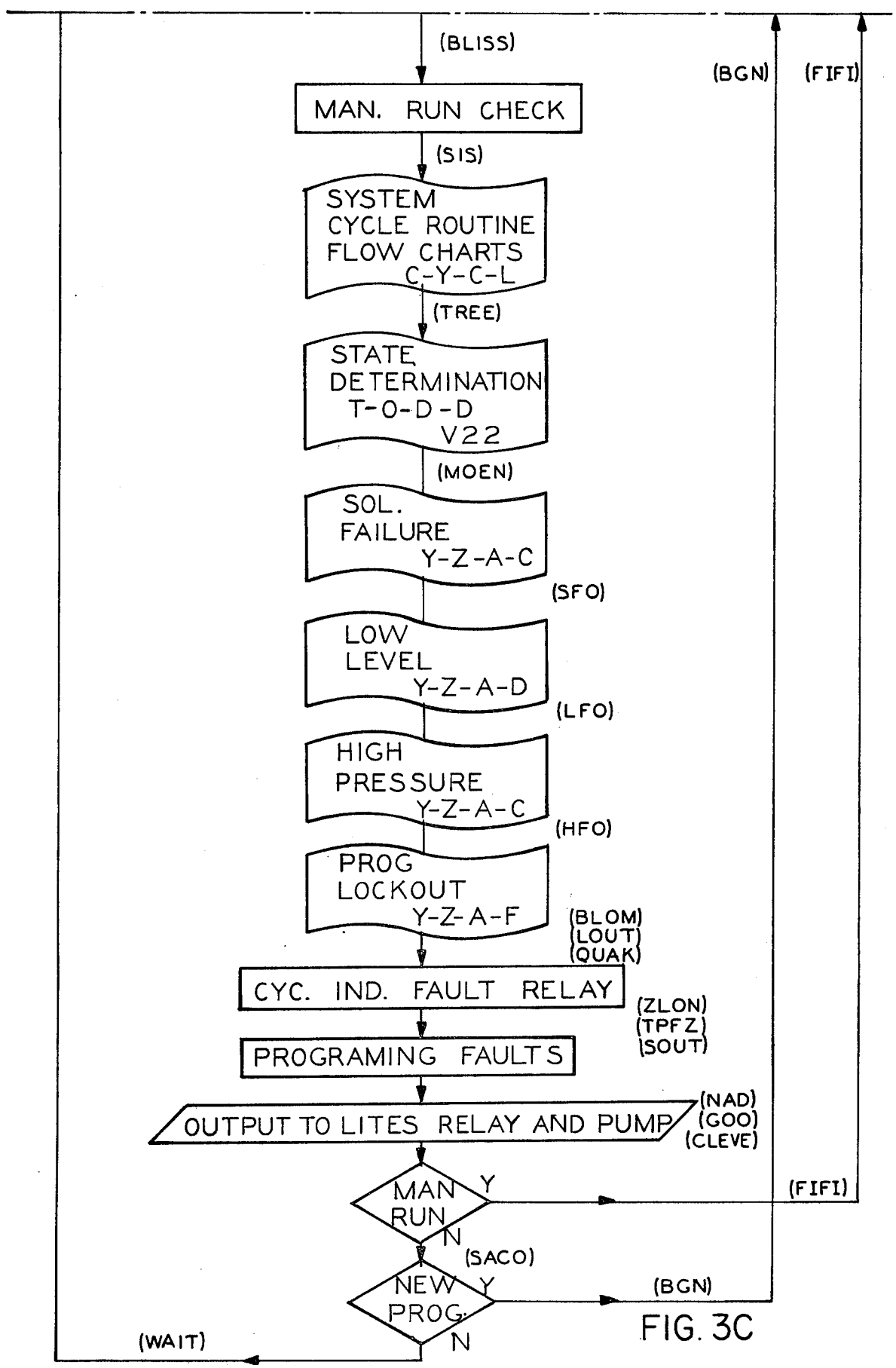
Figure 6:
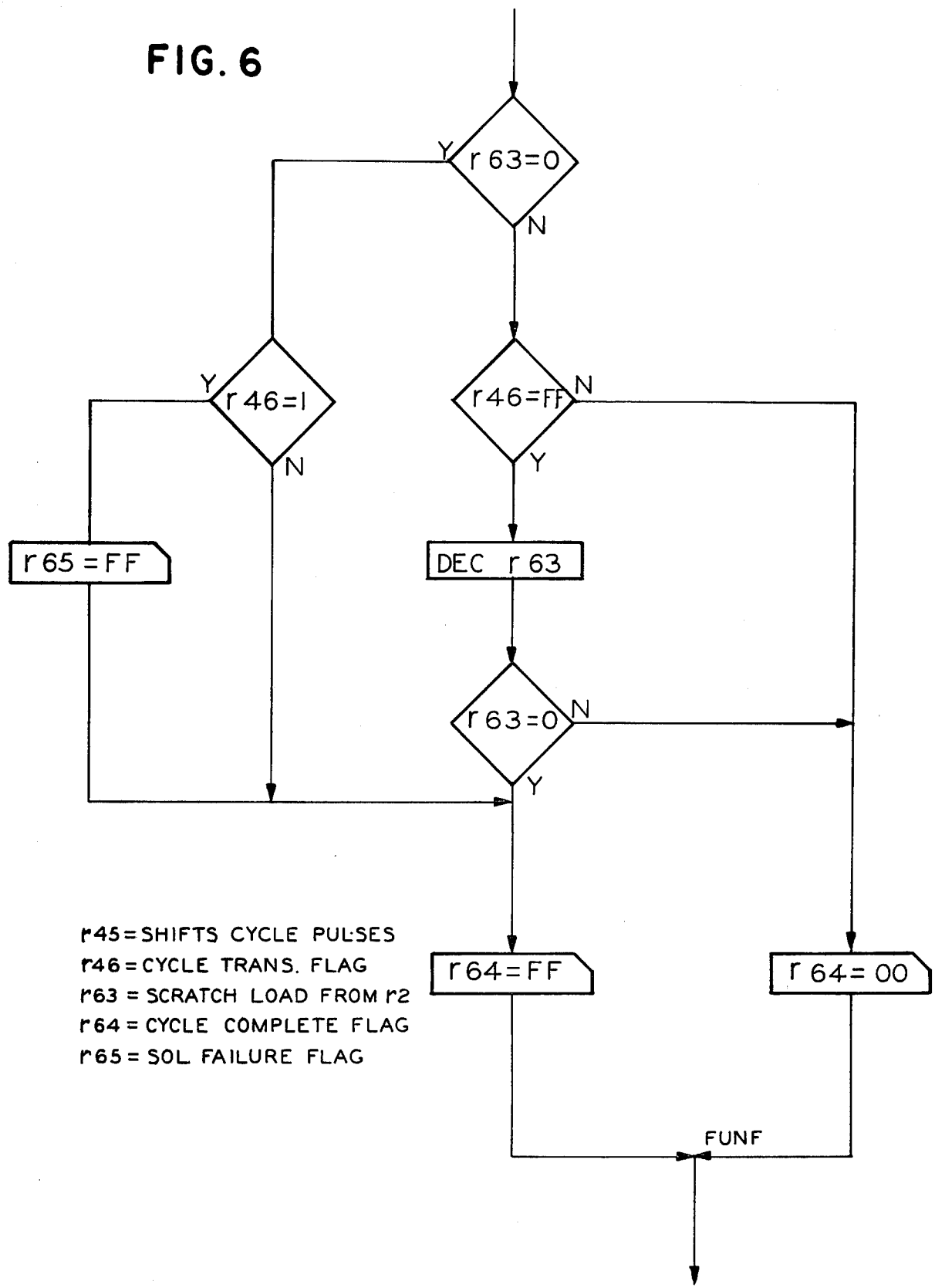
FIG. 6 illustrates the cycle switch routine.
Figure 7:
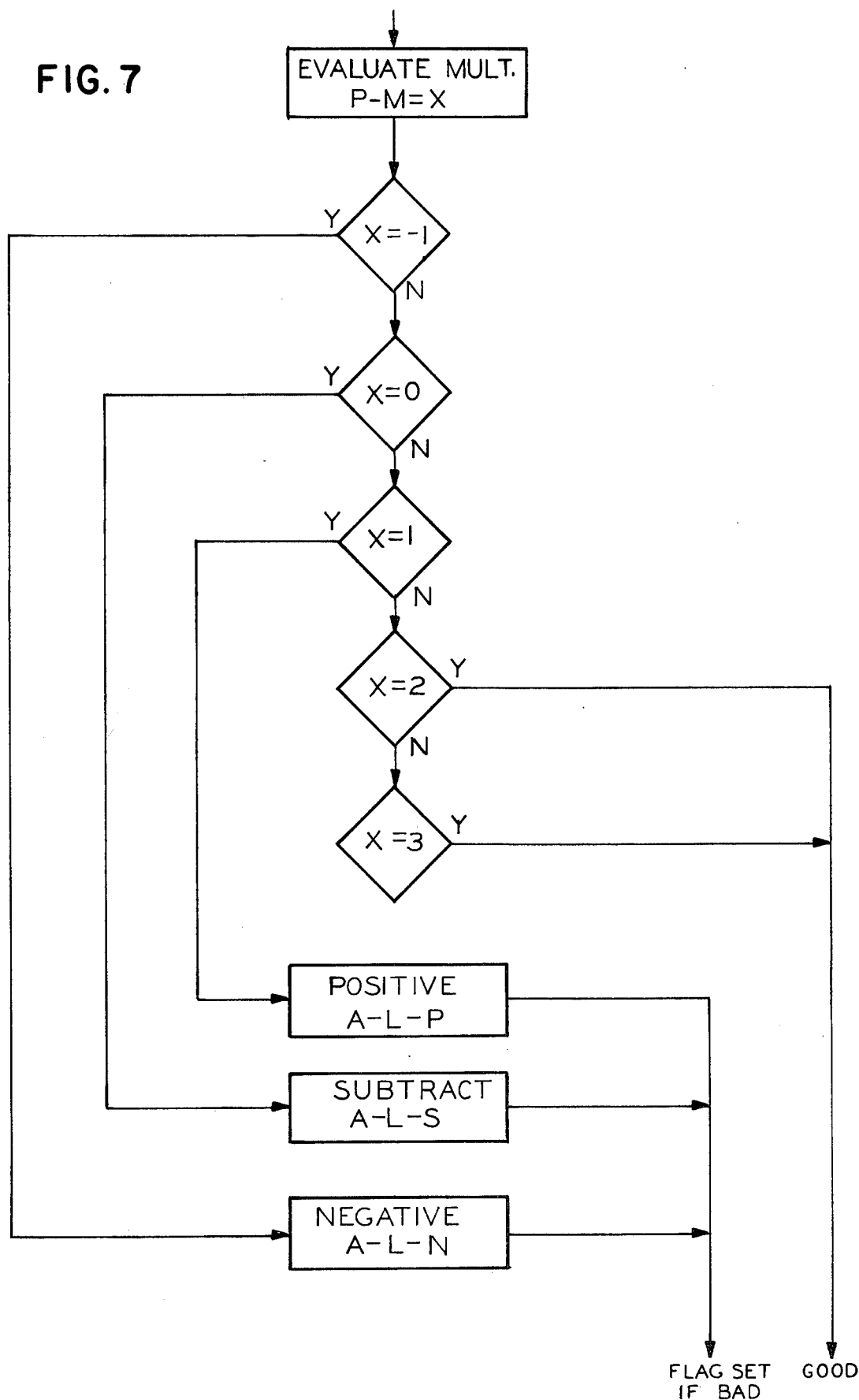
FIG. 7 illustrates the program data check distribution.
Figure 8:
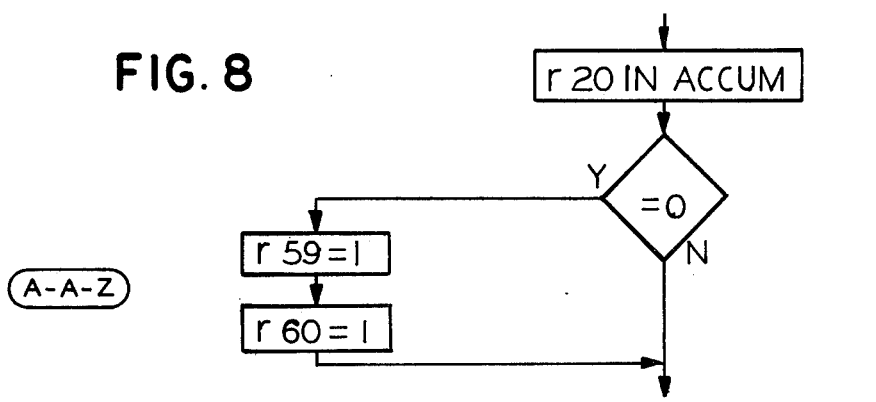
FIG. 8 illustrates the program data zero check, program equal zero.
Figure 9:
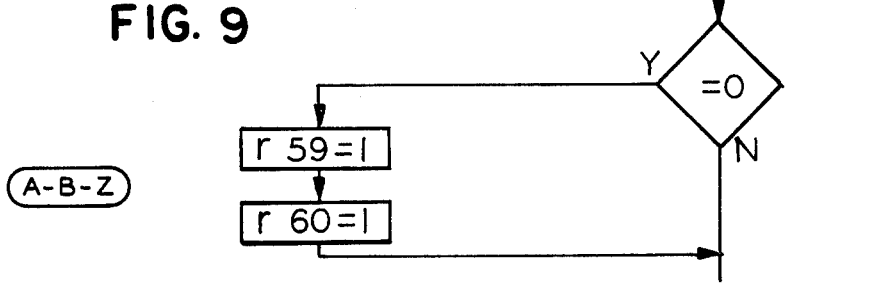
FIG. 9 illustrates the program data zero check, monitor equal zero.
Figure 10:
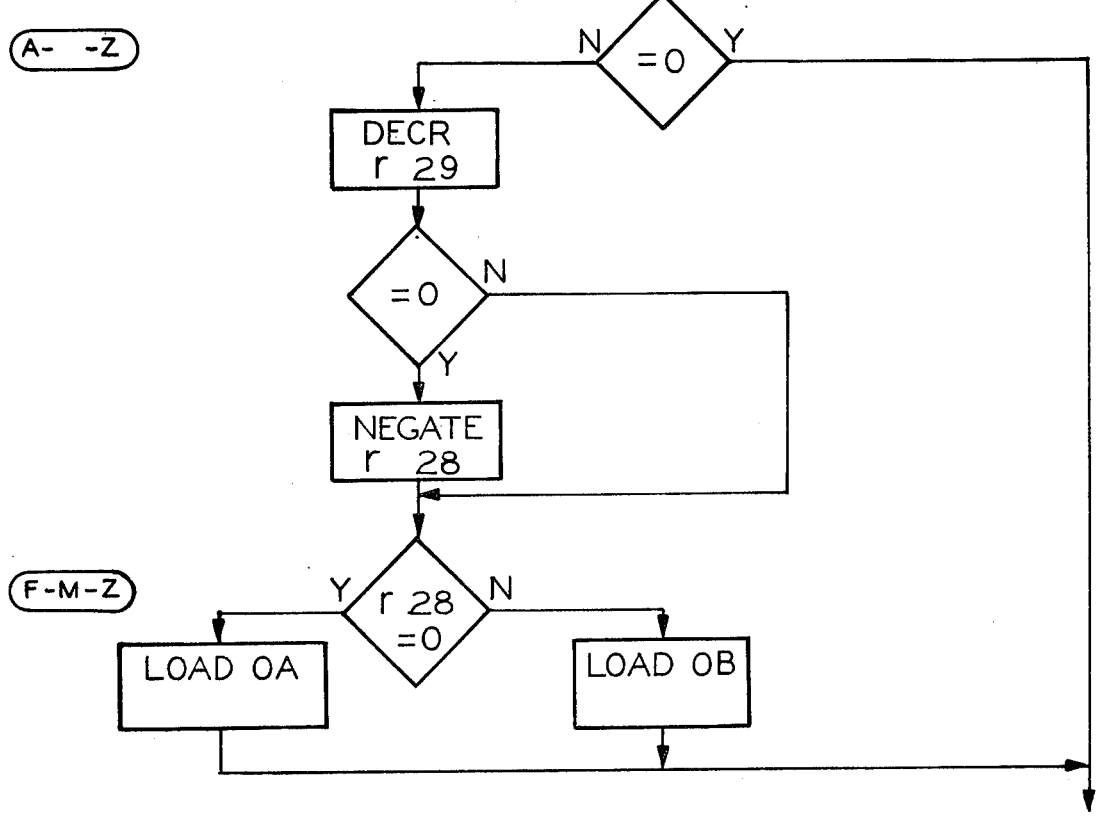
FIG. 10 illustrates the program data zero check, alarm flag.
Figure 11:
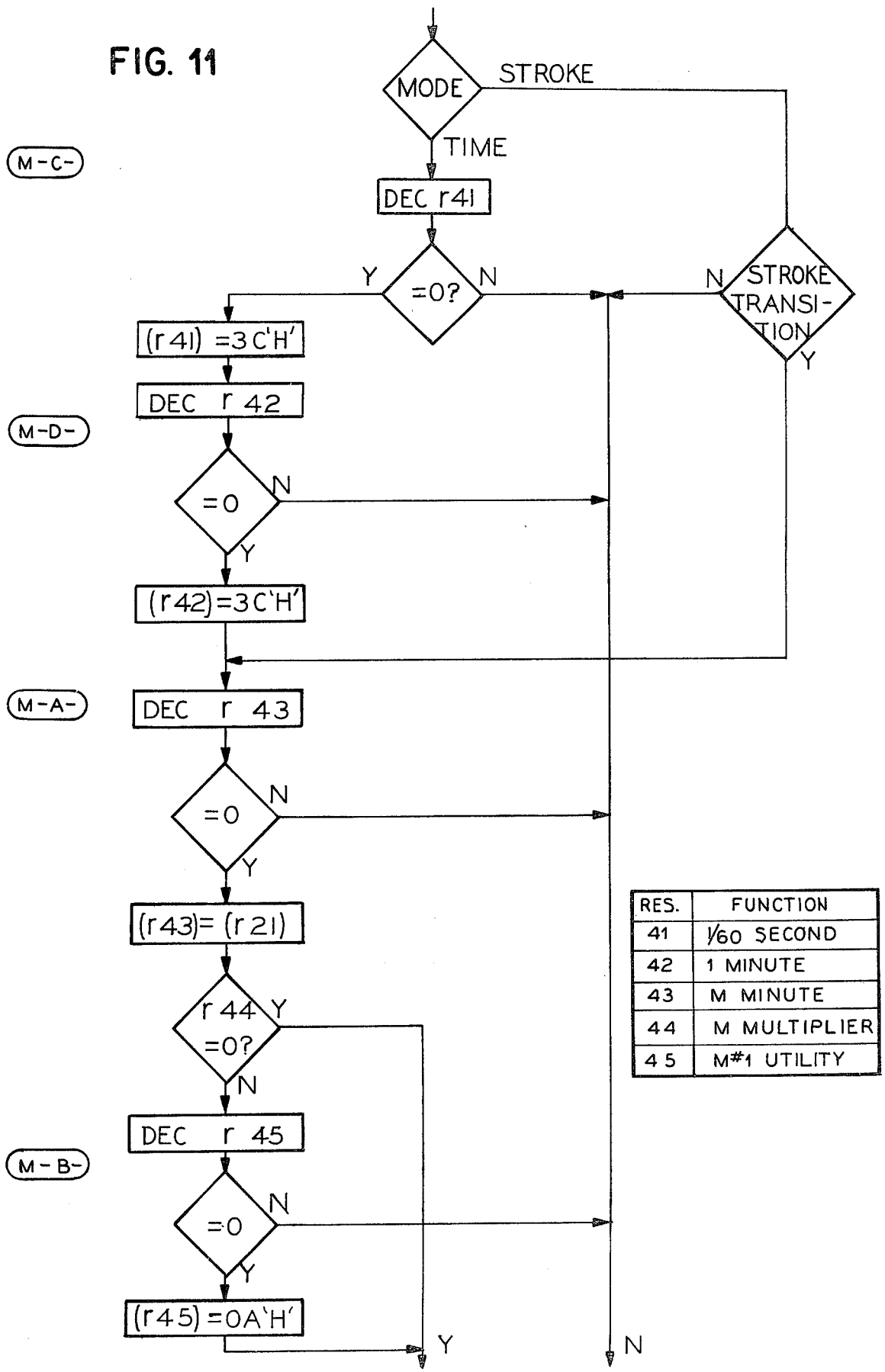
FIG. 11 illustrates the monitor routine.
Figure 12:
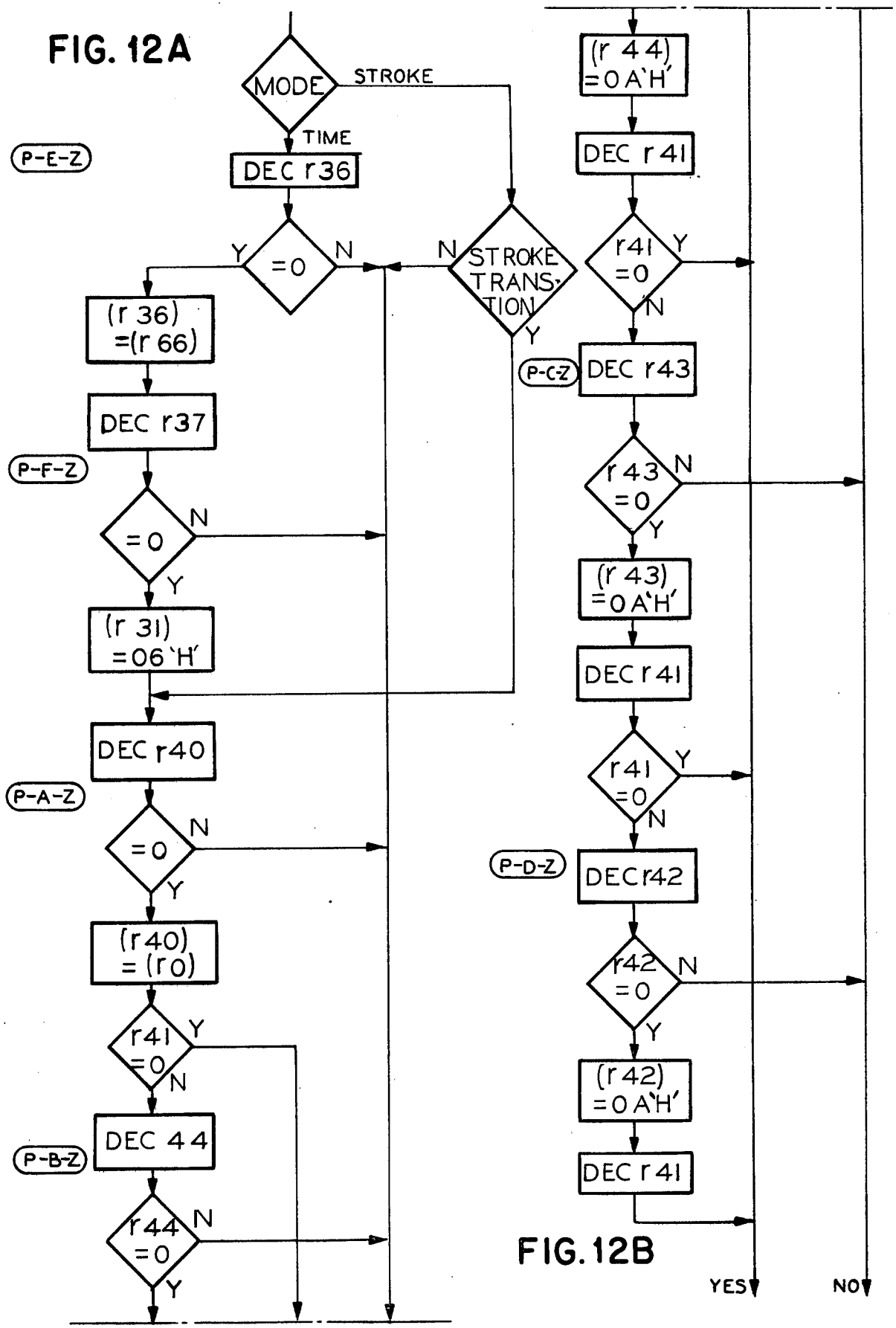
FIGS. 12A and 12B illustrate the program routine.
Figure 13:
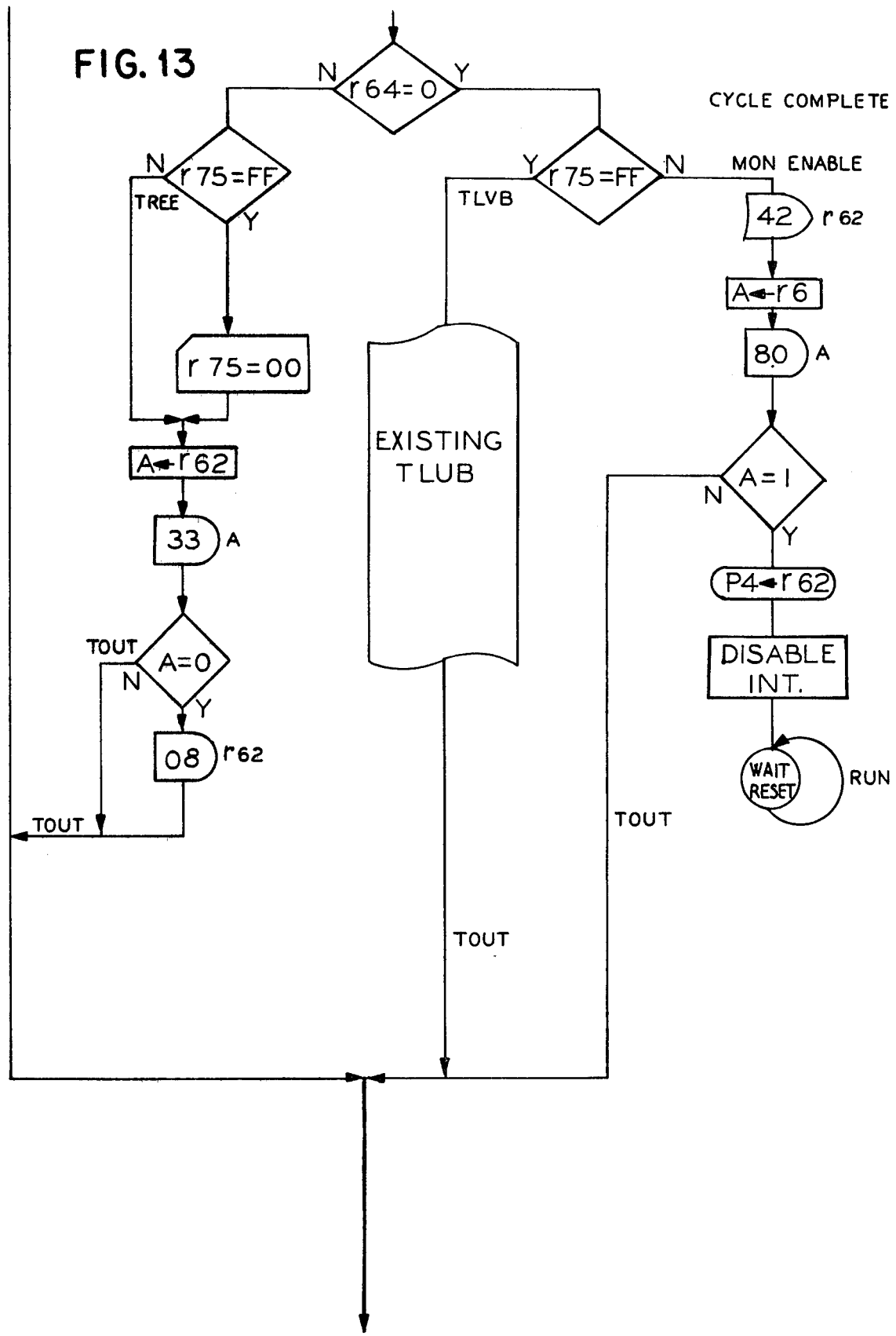
FIG. 13 illustrates the output determination.
Figure 14:
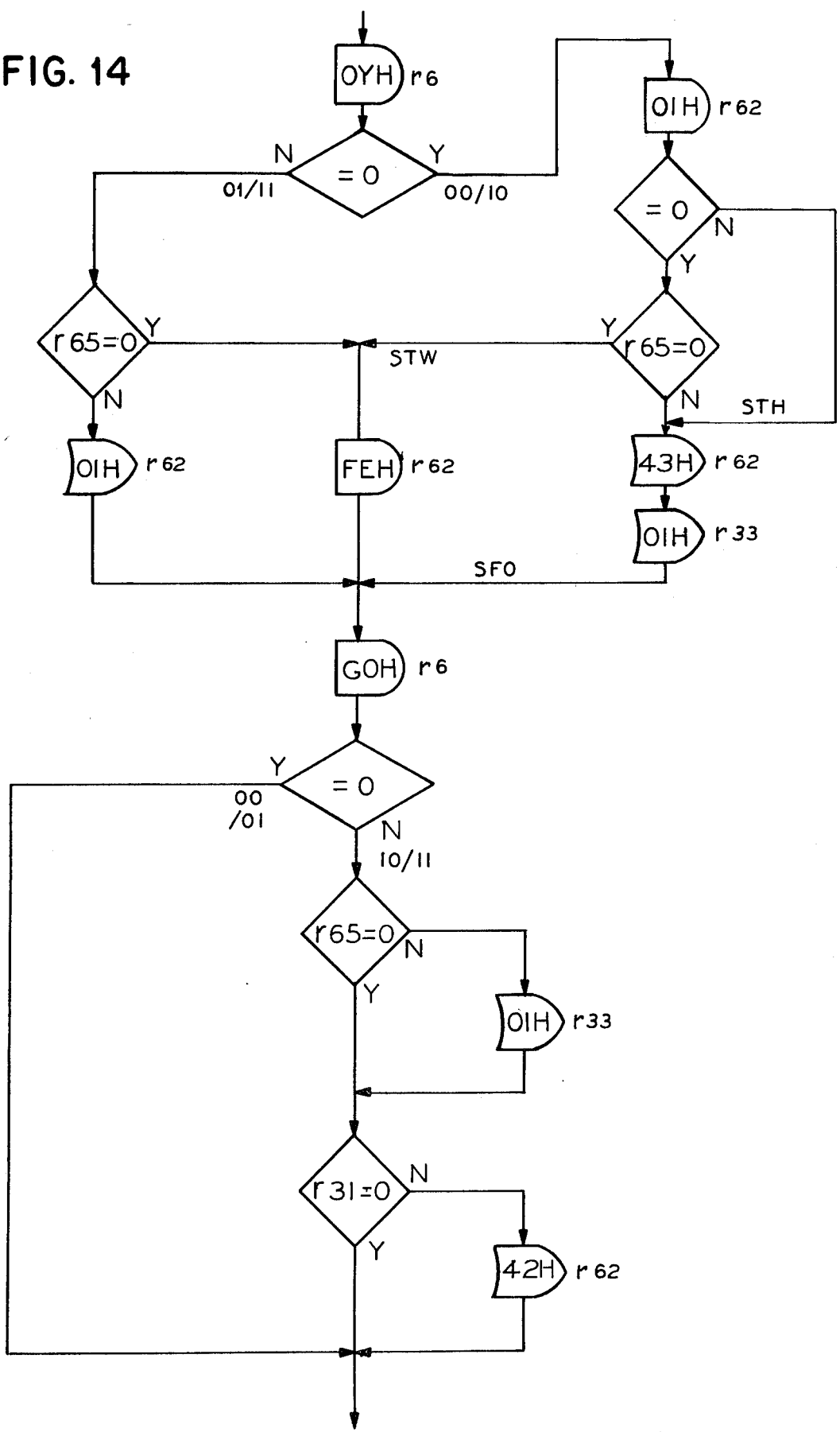
FIG. 14 illustrates the solenoid failure check.
Figure 15:
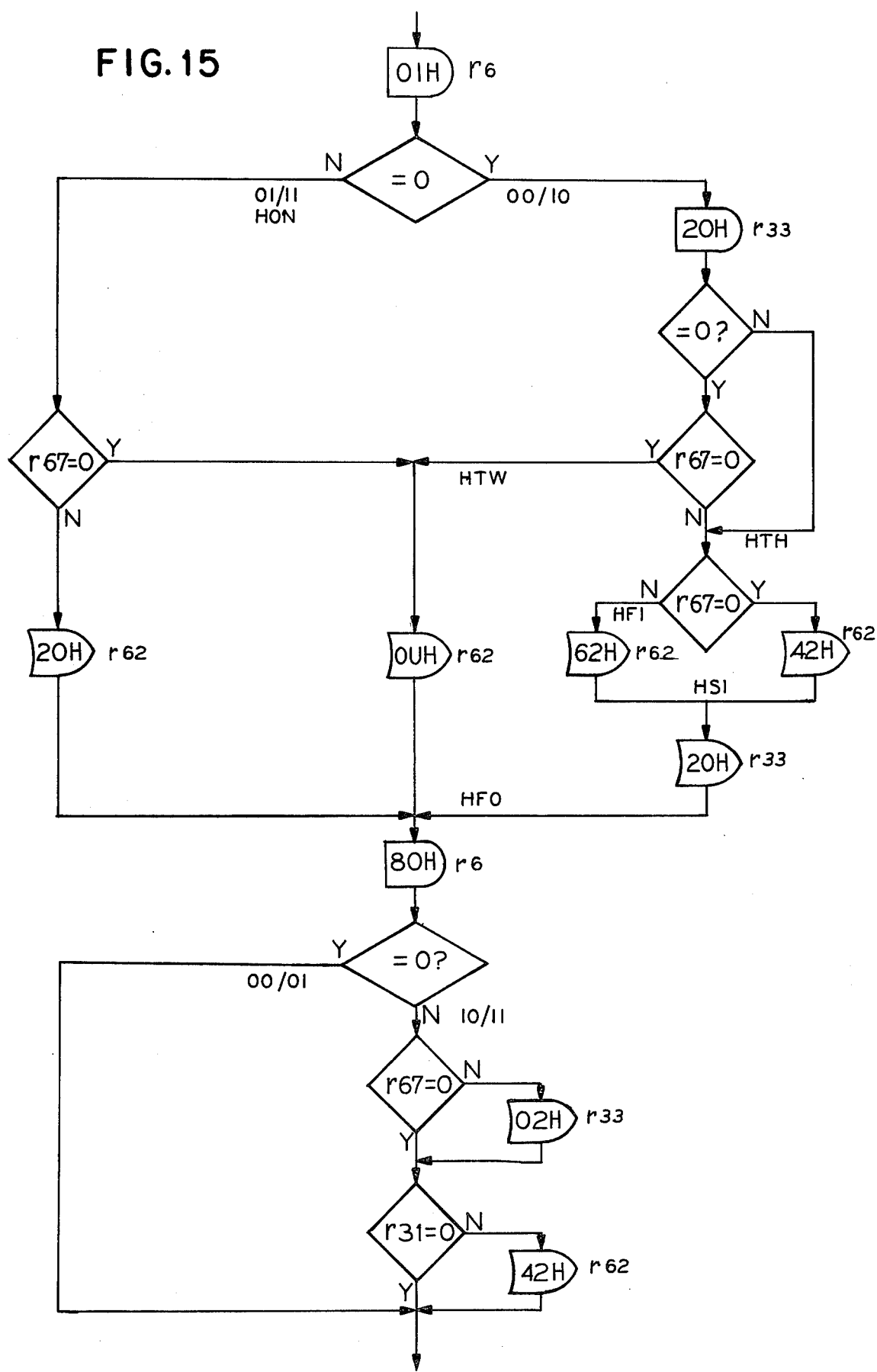
FIG. 15 illustrates the high pressure check.

FIGS. 3A, 3B and 3C comprise the overall functional diagram for the micro-computer software. FIG. 4 illustrates the program data check monitor for a monitor multiplier greater than the program multiplier. FIG. 5 illustrates the program data check with the program multiplier being greater than the monitor multiplier. FIG. 6 illustrates the cycle switch routine. FIG. 7 illustrates the program data check distribution. FIG. 8 illustrates the program data zero check, program equal zero. FIG. 9 illustrates the program data zero check, monitor equal zero. FIG. 10 illustrates the program data zero check, alarm flag. FIG. 11 illustrates the monitor routine. FIGS. 12A and 12B illustrate the program routine. FIG. 13 illustrates the output determination. FIG. 14 illustrates the solenoid failure check and FIG. 15 illustrates the high pressure check.

As an example of setting the monitor and program switches if the program switch is set to a time of three minutes and the monitor is set to a time of two minutes and if the lubrication cycle does not occur in two minutes the monitor switches will cause a fault to be generated and the fault relay 42, thus, giving warning to the operator and turning off the machine 14 so it is not injured. In other words, the monitor is set to a longer time than the normal lubrication cycle and if a lube cycle does not occur before the monitor times out, the monitor will produce a fault thus to protect the equipment.

The following is the truth table for the flow diagram of FIG. 4:

| Negative routine P − M = −1 so P = 0, M = 1 | | |
|---|---|---|
| | P | M |
| LSB | 1–9 | 1/0–9/0 |
| MSB | 10–99 | 10/0–99/0 |
| four possibilities 1 M(LSB) could be less than P (MSB) 2 M(LSB) > P(LSB) 3 M(MSB) > P(LSB) 4 M(MSB) > P(MSB) If M ≧ 10 it is BAD If P < 10 it is BAD so why check condition 1 do this by subtracting P − M where M(LSB) → M(MSB) (× 10) | | |

The following is the truth diagram for FIG. 5:

| Positive routine P − M = 1 so P = 1, M = 0 or P = 2, M = 1 | | |
|---|---|---|
| | P | M |
| LSB | 1/0–9/0 | 1–9 |
| MSB | 10/0–99/0 | 10–99 |
| LSB | 1/00–9/00 | 1/0–9/0 |
| MSB | 10/00–99/00 | 10/0–99/0 |
| in both cases 1 P(LSB) > M(LSB) 2 P(LSB) could be less than M(MSV) 3 P(MSB) > M(LSB) 4 P(MSB) > M(MSB) If P ≧ 10 it is GOOD If M < 10 it is GOOD P − M P = P(LSB) → P(MSB) × 10 | | |

The program for the micro-computer 31 is attached herewith and forms a part of this application.

Although the invention has been described with respect to preferred embodiments, it is not to be so limited as changes and modifications can be made which are within the full intended scope of the invention as defined by the appended claims.

V1.8A ***

| | | | | | |
|---|---|---|---|---|---|
| 0000 | 1A | 0001 | DI | | |
| 0001 | 70 | 0002 | CLR | | |
| 0002 | B6 | 0003 | OUTS | 6 | CLEAR TIMER REGISTER |
| 0003 | 20FF | 0004 | LI | 0FFH | |
| 0005 | B4 | 0005 | OUTS | 4 | CLEAR OUTPUT PORT |
| 0006 | 6A | 0006 | LISL | 2 | |
| 0007 | 66 | 0007 | LISU | 6 | |
| 0008 | 70 | 0008 | CLR | | |
| 0009 | 5C | 0009 | LR | S,A | CLEAR OUTPUT REGISTER |
| 000A | B0 | 0010 | OUTS | 0 | HOLD DATA BUS BITS HIGH |
| 000B | 6D | 0011 | LISL | 5 | |
| 000C | 5D | 0012 | LR | S,A | CLEAR SOL FAILURE FLAG |
| 000D | 6B | 0013 | LISL | 3 | |
| 000E | 63 | 0014 | LISU | 3 | |
| 000F | 5C | 0015 | LR | S,A | CLEAR FAULT REGISTER |
| 0010 | 6C | 0016 | LISL | 4 | |
| 0011 | 5B | 0017 | LR | S,A | CLEAR R34 |
| 0012 | AF | 0018 | LISL | 7 | |
| 0013 | 64 | 0019 | LISU | 4 | |
| 0014 | 6C | 0020 | LR | S,A | CLEAR STROKE PULSES |
| 0015 | 6B | 0021 | LISL | 0 | |
| 0016 | 63 | 0022 | LISU | 5 | |
| 0017 | 5D | 0023 | LR | S,A | CLEAR STROKE TRANSISTION |
| 0018 | 6F | 0024 | LISL | 7 | |
| 0019 | 66 | 0025 | LISU | 6 | |
| 001A | 5D | 0026 | LR | S,A | |
| 001B | 69 | 0027 | LISL | 1 | |
| 001C | 64 | 0028 | LISU | 7 | |
| 001D | 5C | 0029 | LR | S,A | |
| 001E | 6B | 0030 | LISL | 3 | |
| 001F | 5C | 0031 | LR | S,A | |
| 0020 | 6C | 0032 | LISL | 4 | |
| 0021 | 5C | 0033 | LR | S,A | CLR R67,R71,R78,R74 |
| 0022 | 20FF | 0034 | LI | 0FFH | |
| 0024 | 6D | 0035 | LISL | 5 | |
| 0025 | 5B | 0036 | LR | S,A | |
| 0026 | 6F | 0037 | LISL | 7 | |
| 0027 | 5C | 0038 | LR | S,A | SET R75, R77 |
| 0028 | 2B | 0039 | NOP | | |
| 0029 | 2B | 0040 | NOP | | |
| 002A | 2B | 0041 | NOP | | |
| 002B | 2008 | 0042 | LI | 008H | |
| 002D | 18 | 0043 | COM | | |
| 002E | B1 | 0044 | OUTS | 1 | |
| 002F | A0 | 0045 | INS | 0 | |
| 0030 | 56 | 0046 | LR | 6,A | R6: OPITON REGISTER |
| 0031 | 2140 | 0047 | NI | 40H | |
| 0033 | 8419 | 0048 | BZ | FIF1 | |
| 0035 | 2010 | 0049 | LI | 010H | |
| 0037 | 18 | 0050 | COM | | |
| 0038 | B1 | 0051 | OUTS | 1 | |
| 0039 | A0 | 0052 | INS | 0 | |
| 003A | 2180 | 0053 | NI | 080H | |
| 003C | 9410 | 0054 | BNZ | FIF1 | STROKE PROGRAMMED: PRELUBE |
| 003E | A0 | 0055 | INS | 0 | |
| 003F | 12 | 0056 | SR | 1 | |
| 0040 | 14 | 0057 | SR | 4 | |
| 0041 | 1F | 0058 | INC | | |
| 0042 | 2B | 0059 | NOP | | |
| 0043 | 2B | 0060 | NOP | | |
| 0044 | 2B | 0061 | NOP | | |
| 0045 | 2103 | 0062 | NI | 03H | |
| 0047 | 8448 | 0063 | BZ | NPL | PROG MULT IS 0 NO PRELUBE |
| 0049 | 24FF | 0064 | AI | 0FFH | |

| | | | | | |
|---|---|---|---|---|---|
| '004B | 8444 | 0065 | BZ | NPL | PROG MULT IS 1 NO PRELUBE |
| '004D | 70 | 0066 FIFI | CLR | | |
| '004E | 2B | 0067 | NOP | | PROG MULT IS 2 OR 3, |
| '004F | 2B | 0068 | NOP | | AUTOMATIC PRELUBE |
| '0050 | 6C | 0069 | LISL | 4 | |
| '0051 | 63 | 0070 | LISU | 3 | |
| '0052 | 5C | 0071 | LR | S,A | |
| '0053 | 6B | 0072 | LISL | 3 | |
| '0054 | 5C | 0073 | LR | S,A | |
| '0055 | 64 | 0074 | LISU | 7 | |
| '0056 | 5C | 0075 | LR | S,A | CLR R34, R33, R73 |
| '0057 | 20FF | 0076 | LI | 0FFH | |
| '0059 | 6H | 0077 | LISL | 5 | |
| '005A | 67 | 0078 | LISU | 7 | |
| '005B | 5C | 0079 | LR | S,A | |
| '005C | 6A | 0080 | LISL | 2 | |
| '005D | 62 | 0081 | LISU | 2 | |
| '005E | 5C | 0082 | LR | S,A | SET R75, R22 |
| '005F | 2B | 0083 | NOP | | |
| '0060 | 2B | 0084 | NOP | | |
| '0061 | 2B | 0085 | NOP | | |
| '0062 | 2B | 0086 | NOP | | |
| '0063 | 2B | 0087 | NOP | | |
| '0064 | 2B | 0088 | NOP | | |
| '0065 | 2B | 0089 | NOP | | |
| '0066 | 2B | 0090 | NOP | | |
| '0067 | 6D | 0091 BGN | LISL | 5 | |
| '0068 | 66 | 0092 | LISU | 6 | |
| '0069 | 70 | 0093 | CLR | | |
| '006A | 50 | 0094 | LR | S,A | O.R  SOL FAILURE FLAG |
| '006B | 2004 | 0095 | LI | 004H | |
| '006D | 2B | 0096 | NOP | | |
| '006E | 18 | 0097 | COM | | |
| '006F | B1 | 0098 | OUTS | 1 | |
| '0070 | A0 | 0099 | INS | 0 | |
| '0071 | 2400 | 0100 | AI | 00H | |
| '0073 | 9403 | 0101 | BNZ | 1AC | |
| '0075 | 2001 | 0102 | LI | 01H | |
| '0077 | 52 | 0103 1AC | LR | 2,A | R2: CYCLE THUMB WHEELS |
| '0078 | 2010 | 0104 | LI | 010H | |
| '007A | 2B | 0105 | NOP | | |
| '007B | 18 | 0106 | COM | | |
| '007C | B1 | 0107 | OUTS | 1 | |
| '007D | A0 | 0108 | INS | 0 | |
| '007E | 2194 | 0109 | NI | 94H | |
| '0080 | 55 | 0110 | LR | 5,A | R5: ROUTINE REGISTER |
| '0081 | 6B | 0111 | LISU | 3 | |
| '0082 | 66 | 0112 | LISU | 6 | R63: CYCLE UTILITY |
| '0083 | 45 | 0113 | LR | A,5 | |
| '0084 | 2104 | 0114 | NI | 04H | |
| '0086 | 8405 | 0115 | BZ | SING | |
| '0088 | 42 | 0116 | LR | A,2 | MULTIPLE CYCLE |
| '0089 | 5C | 0117 | LR | S,A | |
| '008A | 9003 | 0118 | BR | MULT | |
| '008C | 71 | 0119 SING | LIS | 01H | |
| '008D | 5C | 0120 | LR | S,A | |
| '008E | 9008 | 0121 MULT | BR | PL | |
| '0090 | 6B | 0122 NPL | LISL | 3 | |
| '0091 | 66 | 0123 | LISU | 6 | |
| '0092 | 70 | 0124 | CLR | | |
| '0093 | 5C | 0125 | LR | S,A | *NO PRELUBE* |
| '0094 | 6D | 0126 | LISL | 5 | CLEAR MONITOR ENABLE |
| '0095 | 67 | 0127 | LISU | 7 | |
| '0096 | 50 | 0128 | LR | S,A | |

| | | | | | |
|---|---|---|---|---|---|
| '0097 | 9012 | 0129 PL | BR | CONT | |
| '0099 | 2015 | 0130 WAIT | LI | 015H | WAIT FOR EXT INT |
| '009B | B6 | 0131 | OUTS | 6 | |
| '009C | 1B | 0132 | EI | | |
| '009D | 2B | 0133 SPIN | NOP | | |
| '009E | 90FE | 0134 | BR | SPIN | |
| '00A0 | 2B | 0135 | NOP | | |
| '00A1 | 2B | 0136 | NOP | | |
| '00A2 | 2B | 0137 | NOP | | |
| '00A3 | 1A | 0138 | DI | | THIS IS 60 HERTZ EXT INT |
| '00A4 | 290190 A | 0139 | JMP | IAA | |
| '00A7 | 2B | 0140 | NOP | | |
| '00A8 | 2B | 0141 | NOP | | |
| '00A9 | 2B | 0142 | NOP | | |
| '00AA | 70 | 0143 CONT | CLR | | |
| '00AB | 69 | 0144 | LISL | 1 | |
| '00AC | 63 | 0145 | LISU | 3 | |
| '00AD | 50 | 0146 | LR | S,A | CLEAR MANUAL RUN REGISTER |
| '00AE | 6D | 0147 | LISL | 5 | |
| '00AF | 67 | 0148 | LISU | 7 | |
| '00B0 | 20FF | 0149 | LI | 0FFH | |
| '00B2 | 2B | 0150 | NOP | | |
| '00B3 | 2001 | 0151 | LI | 001H | |
| '00B5 | 18 | 0152 | COM | | |
| '00B6 | B1 | 0153 | OUTS | 1 | |
| '00B7 | A0 | 0154 | INS | 0 | |
| '00B8 | 50 | 0155 | LR | 0,A | R0:PROGRAM THUMBWHEELS |
| '00B9 | 2002 | 0156 | LI | 002H | |
| '00BB | 18 | 0157 | COM | | |
| '00BC | B1 | 0158 | OUTS | 1 | |
| '00BD | A0 | 0159 | INS | 0 | |
| '00BE | 51 | 0160 | LR | 1,A | R1:MONITOR THUMBWHEELS |
| '00BF | 2010 | 0161 | LI | 010H | ROUTINE STROBE |
| '00C1 | 18 | 0162 | COM | | |
| '00C2 | B1 | 0163 | OUTS | 1 | |
| '00C3 | A0 | 0164 | INS | 0 | |
| '00C4 | 12 | 0165 | SR | 1 | |
| '00C5 | 14 | 0166 | SR | 4 | |
| '00C6 | 1F | 0167 | INC | | |
| '00C7 | 2B | 0168 | NOP | | |
| '00C8 | 2B | 0169 | NOP | | |
| '00C9 | 2B | 0170 | NOP | | |
| '00CA | 2103 | 0171 | NI | 3 | |
| '00CC | 53 | 0172 | LR | 3,A | R3:PROGRAM MULTIPLIER |
| '00CD | A0 | 0173 | INS | 0 | #0-3 BINARY |
| '00CE | 12 | 0174 | SR | 1 | |
| '00CF | 12 | 0175 | SR | 1 | |
| '00D0 | 12 | 0176 | SR | 1 | |
| '00D1 | 2101 | 0177 | NI | 1 | |
| '00D3 | 54 | 0178 | LR | 4,A | R4:MONITOR MULTIPLIER |
| '00D4 | 2008 | 0179 | LI | 008H | |
| '00D6 | 2B | 0180 | NOP | | |
| '00D7 | 18 | 0181 | COM | | |
| '00D8 | B1 | 0182 | OUTS | 1 | |
| '00D9 | A0 | 0183 | INS | 0 | |
| '00DA | 56 | 0184 | LR | 6,A | R6:OPTION REGISTER |
| '00DB | 2010 | 0185 | LI | 010H | |
| '00DD | 18 | 0186 | COM | | |
| '00DE | B1 | 0187 | OUTS | 1 | |
| '00DF | A0 | 0188 | INS | 0 | |
| '00E0 | 2101 | 0189 | NI | 1 | |
| '00E2 | 8404 | 0190 | BZ | IAJA | |
| '00E4 | 76 | 0191 | LIS | 6 | |
| '00E5 | 9002 | 0192 | BR | IAJB | |

| | | | | | | |
|---|---|---|---|---|---|---|
| '00F7 | 73 | | 0193 | IAJA | LIS | 3 |
| '00E8 | 57 | | 0194 | IAJB | LR | 7,A | R7:RECYCLE REGISTER
| '00F9 | 6E | | 0195 | | LISL | 6 |
| '00EA | 66 | | 0196 | | LISU | 6 | OCTAL R64:HERTZ REGISTER
| '00EB | 46 | | 0197 | | LR | A,6 |
| '00ED | 2120 | | 0198 | | NI | 20H |
| '00EE | 8406 | | 0199 | | BZ | IAKA |
| '00F0 | 2032 | | 0200 | | LI | 32H | *50 HERTZ
| '00F2 | 5C | | 0201 | | LR | S,A |
| '00F3 | 9004 | | 0202 | | BR | IAKB |
| '00F5 | 203C | | 0203 | IAKA | LI | 3CH | *60 HERTZ
| '00F7 | 5C | | 0204 | | LR | S,A |
| '00F8 | 2B | | 0205 | IAKB | NOP | | START ALARM TESTS:
| '00F9 | 40 | | 0206 | | LR | A,0 |
| '00FA | 2400 | | 0207 | | AI | 0 | CHECK IF PROGRAM IS
| '00FB | 9407 | | 0208 | | BNZ | AAZ | SET TO ZERO
| '00FD | 6C | | 0209 | | LISL | 4 |
| '00FE | 67 | | 0210 | | LISU | 7 | OCTAL R74:PROGRAM FAULT FLAG
| '0100 | 20FF | | 0211 | | LI | 0FFH |
| '0102 | 5C | | 0212 | | LR | S,A |
| '0103 | 29019F' | A | 0213 | | JMP | ADS |
| '0106 | 2B | | 0214 | AAZ | NOP | |
| '0107 | 41 | | 0215 | | LR | A,1 | MON FOR ALARM TEST
| '0108 | 2400 | | 0216 | | AI | 0 | FOR MONITOR ZERO SETTING
| '010A | 9409 | | 0217 | | BNZ | ABZ |
| '010C | 6C | | 0218 | | LISL | 4 |
| '010D | 67 | | 0219 | | LISU | 7 | OCTAL R74:PROG FAULT FLAG
| '010E | 20FF | | 0220 | | LI | 0FFH |
| '0110 | 5C | | 0221 | | LR | S,A |
| '0111 | 29019F' | A | 0222 | | JMP | ADS |
| '0114 | 45 | | 0223 | ABZ | LR | A,5 |
| '0115 | 2190 | | 0224 | | NI | 90H |
| '0117 | 2590 | | 0225 | | CI | 90H |
| '0119 | 840B | | 0226 | | BZ | ABU | P IS STROKE, M IS STROKE
| '011B | 45 | | 0227 | | LR | A,5 |
| '011C | 2190 | | 0228 | | NI | 90H |
| '011E | 8406 | | 0229 | | BZ | ABU | P IS TIME, M IS TIME
| '0120 | 29019F' | A | 0230 | | JMP | ADS |
| '0123 | 2B | | 0231 | | NOP | | TO COMPARE MAGNITUDE
| '0124 | 2B | | 0232 | | NOP | | OF PROG AND MON SETTINGS
| '0125 | 71 | | 0233 | ABU | LIS | 01H |
| '0126 | 5A | | 0234 | | LR | 10,A |
| '0127 | 44 | | 0235 | | LR | A,4 |
| '0128 | 18 | | 0236 | | COM | |
| '0129 | 1F | | 0237 | | INC | |
| '012A | 13 | | 0238 | | AS | 3 | COMPARE MULTIPLIERS
| '012B | 910D | | 0239 | | BM | ALN | P-M IS -1, ALN
| '012D | 8448 | | 0240 | | BZ | ALS | P-M IS 0, ALS
| '012F | 5B | | 0241 | | LR | 11,A |
| '0130 | 3B | | 0242 | | DS | 11 | P-M IS 2, GOOD
| '0131 | 8425 | | 0243 | | BZ | ALP | P-M IS 3, GOOD
| '0133 | 3B | | 0244 | | DS | 11 |
| '0134 | 845E | | 0245 | | BZ | GOOD |
| '0136 | 3B | | 0246 | | DS | 11 |
| '0137 | 845B | | 0247 | | BZ | GOOD |
| '0139 | 2B | | 0248 | ALN | NOP | |
| '013A | 40 | | 0249 | | LR | A,0 |
| '013B | 24F6 | | 0250 | | AI | 0F6H |
| '013D | 2B | | 0251 | | NOP | |
| '013E | 2B | | 0252 | | NOP | |
| '013F | 924A | | 0253 | | BNC | BAD |
| '0141 | 41 | | 0254 | | LR | A,1 |
| '0142 | 24F6 | | 0255 | | AI | 0F6H |
| '0144 | 2B | | 0256 | | NOP | |

| | | | | | |
|---|---|---|---|---|---|
| '0145 | 2B | 0257 | | NOP | |
| '0146 | 824C | 0258 | | BC | GOOD |
| '0148 | 41 | 0259 | | LR | A,1 |
| '0149 | 15 | 0260 | | SL | 4 |
| '014A | 18 | 0261 | | COM | |
| '014B | DA | 0262 | | ASD | 10 |
| '014C | 2466 | 0263 | | AI | 066H |
| '014E | D0 | 0264 | | ASD | 0 |
| '014F | 923A | 0265 | | BNC | BAD | SEE FLOWCHART ALN......... |
| '0151 | 21FF | 0266 | | NI | 0FFH |
| '0153 | 8436 | 0267 | | BZ | BAD |
| '0155 | 9030 | 0268 | | BR | GOOD |
| '0157 | 2B | 0269 | ALP | NOP | |
| '0158 | 40 | 0270 | | LR | A,0 |
| '0159 | 24F6 | 0271 | | AI | 0F6H |
| '015B | 2B | 0272 | | NOP | |
| '015C | 2B | 0273 | | NOP | |
| '015D | 8235 | 0274 | | BC | GOOD |
| '015F | 41 | 0275 | | LR | A,1 |
| '0160 | 24F6 | 0276 | | AI | 0F6H |
| '0162 | 2B | 0277 | | NOP | |
| '0163 | 2B | 0278 | | NOP | |
| '0164 | 922A | 0279 | | BNC | GOOD |
| '0166 | 40 | 0280 | | LR | A,0 |
| '0167 | 15 | 0281 | | SL | 4 |
| '0168 | 68 | 0282 | | LISL | 0 |
| '0169 | 62 | 0283 | | LISU | 2 |
| '016A | 5C | 0284 | | LR | S,A |
| '016B | 41 | 0285 | | LR | A,1 |
| '016C | 18 | 0286 | | COM | |
| '016D | DA | 0287 | | ASD | 10 |
| '016E | 2466 | 0288 | | AI | 066H |
| '0170 | DC | 0289 | | ASD | S |
| '0171 | 9218 | 0290 | | BNC | BAD | SEE FLOWCHART ALP........ |
| '0173 | 21FF | 0291 | | NI | 0FFH |
| '0175 | 8414 | 0292 | | BZ | BAD |
| '0177 | 901B | 0293 | | BR | GOOD |
| '0179 | 2B | 0294 | ALS | NOP | |
| '017A | 41 | 0295 | | LR | A,1 |
| '017B | 18 | 0296 | | COM | |
| '017C | DA | 0297 | | ASD | 10 |
| '017D | 2466 | 0298 | | AI | 066H |
| '017F | D0 | 0299 | | ASD | 0 |
| '0180 | 2B | 0300 | | NOP | |
| '0181 | 2B | 0301 | | NOP | |
| '0182 | 8202 | 0302 | | BC | DIE |
| '0184 | 9005 | 0303 | | BR | BAD |
| '0186 | 21FF | 0304 | DIE | NI | 0FFH |
| '0188 | 940A | 0305 | | BNZ | GOOD |
| '018A | 2B | 0306 | BAD | NOP | |
| '018B | 6B | 0307 | | LISL | 4 |
| '018C | 67 | 0308 | | LISU | 7 |
| '018D | 20FF | 0309 | | LI | 0FFH |
| '018F | 5C | 0310 | | LR | S,A |
| '0190 | 9006 | 0311 | | BR | TAT |
| '0192 | 2B | 0312 | | NOP | |
| '0193 | 6C | 0313 | GOOD | LISL | 4 |
| '0194 | 67 | 0314 | | LISU | 7 |
| '0195 | 70 | 0315 | | CLR | |
| '0196 | 5C | 0316 | | LR | S,A |
| '0197 | 2B | 0317 | TAT | NOP | |
| '0198 | 2B | 0318 | | NOP | |
| '0199 | 290191 | A | 0319 | | JMP | AUS |
| '019C | 290015 | A | 0320 | IAA | JMP | START |

| | | | | | | |
|---|---|---|---|---|---|---|
| '019F | 41 | 0321 | ANS | LR | A,1 | LOAD PROGRAM |
| '01A0 | 68 | 0322 | | LISL | 3 | AND MONITOR REGISTERS |
| '01A1 | 65 | 0323 | | LISU | 5 | |
| '01A2 | 5C | 0324 | | LR | S,A | |
| '01A3 | 44 | 0325 | | LR | A,4 | |
| '01A4 | 6C | 0326 | | LISL | 4 | |
| '01A5 | 5C | 0327 | | LR | S,A | |
| '01A6 | 40 | 0328 | | LR | A,0 | |
| '01A7 | 68 | 0329 | | LISL | 0 | |
| '01A8 | 64 | 0330 | | LISU | 4 | |
| '01A9 | 5C | 0331 | | LR | S,A | |
| '01AA | 43 | 0332 | | LR | A,3 | |
| '01AB | 69 | 0333 | | LISL | 1 | |
| '01AC | 5C | 0334 | | LR | S,A | |
| '01AD | 70 | 0335 | | CLR | | |
| '01AE | 6D | 0336 | | LISL | 5 | |
| '01AF | 64 | 0337 | | LISU | 4 | |
| '01B0 | 2B | 0338 | | NOP | | CLEAR R45, R46 |
| '01B1 | 5D | 0339 | | LR | I,A | |
| '01B2 | 5C | 0340 | | LR | S,A | |
| '01B3 | 68 | 0341 | | LISL | 0 | |
| '01B4 | 67 | 0342 | | LISU | 7 | |
| '01B5 | 5C | 0343 | | LR | S,A | |
| '01B6 | 6A | 0344 | | LISL | 2 | |
| '01B7 | 5C | 0345 | | LR | S,A | CLR R70,R72 |
| '01B8 | 68 | 0346 | | LISL | 0 | |
| '01B9 | 66 | 0347 | | LISU | 6 | CLEAN RECYCLE FLIP FLOP |
| '01BA | 20FF | 0348 | | LI | 0FFH | |
| '01BC | 5C | 0349 | | LR | S,A | |
| '01BD | 6E | 0350 | | LISL | 6 | |
| '01BE | 66 | 0351 | | LISU | 6 | |
| '01BF | 4C | 0352 | | LR | A,3 | |
| '01C0 | 63 | 0353 | | LISU | 3 | R68 E R36 |
| '01C1 | 5C | 0354 | | LR | S,A | |
| '01C2 | 6F | 0355 | | LISL | 7 | |
| '01C3 | 65 | 0356 | | LISU | 5 | |
| '01C4 | 5C | 0357 | | LR | S,A | R66 E R57 |
| '01C5 | 69 | 0358 | | LISL | 1 | |
| '01C6 | 5C | 0359 | | LR | S,A | R66 E R51 |
| '01C7 | 2006 | 0360 | | LI | 06H | |
| '01C9 | 6F | 0361 | | LISL | 7 | |
| '01CA | 63 | 0362 | | LISU | 3 | |
| '01CB | 5C | 0363 | | LR | S,A | 06H E R37 |
| '01CC | 6A | 0364 | | LISL | 2 | |
| '01CD | 65 | 0365 | | LISU | 5 | |
| '01CE | 5C | 0366 | | LR | S,A | 06H E R52 |
| '01CF | 200A | 0367 | | LI | 0AH | |
| '01D1 | 6D | 0368 | | LISL | 5 | |
| '01D2 | 65 | 0369 | | LISU | 5 | |
| '01D3 | 5C | 0370 | | LR | S,A | 0AH E R55 |
| '01D4 | 6C | 0371 | | LISL | 4 | |
| '01D5 | 6D | 0372 | | LISL | 4 | |
| '01D6 | 5E | 0373 | | LR | D,A | 0AH E R44 |
| '01D7 | 5E | 0374 | | LR | D,A | 0AH E R43 |
| '01D8 | 5D | 0375 | | LR | S,A | 0AH E R42 |
| '01D9 | 2B | 0376 | | NOP | | |
| '01DA | 2B | 0377 | | NOP | | |
| '01DB | 68 | 0378 | | LISL | A | |
| '01DC | 65 | 0379 | | LISU | 5 | |
| '01DD | 47 | 0380 | | LR | A,7 | |
| '01DE | 5C | 0381 | | LR | S,A | R7 E R5A |
| '01DF | 6A | 0382 | | LISL | 2 | |
| '01E0 | 66 | 0383 | | LISU | 6 | |
| '01E1 | 40 | 0384 | | LR | A,5 | |

| | | | | | |
|---|---|---|---|---|---|
| '01E2 | 21F7 | 0385 | | NI | 0F7H |
| '01E4 | 2284 | 0386 | | OI | 084H |
| '01E6 | 5E | 0387 | | LR | S,A  PRE-ORIENT R62 |
| '01E7 | 2B | 0388 | | NOP | |
| '01E8 | 2B | 0389 | | NOP | |
| '01E9 | 2B | 0390 | | NOP | |
| '01EA | 2B | 0391 | | NOP | |
| '01EB | 2B | 0392 | | NOP | |
| '01EC | 2B | 0393 | | NOP | |
| '01ED | 2B | 0394 | | NOP | |
| '01EE | 290099 | 0395 | ESCP | JMP | WAIT |
| '01F1 | 2B | 0396 | | NOP | STARTS EVERY HERTZ |
| '01F2 | 2B | 0397 | | NOP | UPDATES SWITCH STATUS |
| '01F3 | 2B | 0398 | | NOP | |
| '01F4 | 2B | 0399 | | NOP | |
| '01F5 | 74 | 0400 | START | LIS | 4   WASTE TIME LOOP |
| '01F6 | 2B | 0401 | | NOP | |
| '01F7 | 5A | 0402 | | LR | 10,A  3.0 MILLISECOND DELAY |
| '01F8 | 73 | 0403 | OUT | LIS | 3   FOR RESISTOR |
| '01F9 | 5B | 0404 | | LR | 11,A  AND INPUT COUPLER |
| '01FA | 12 | 0405 | IN | SR | 1 |
| '01FB | 3B | 0406 | | DS | 11 |
| '01FC | 94FD | 0407 | | BNZ | IN |
| '01FE | 13 | 0408 | | SL | 1 |
| '01FF | 3A | 0409 | | DS | 10 |
| '0200 | 94F7 | 0410 | | BNZ | OUT |
| '0202 | A5 | 0411 | | ONS | 5 |
| '0203 | 5A | 0412 | | LR | 10,A |
| '0204 | 2B | 0413 | | NOP | |
| '0205 | 2B | 0414 | | NOP | R10 USED TO STORE PRESENT |
| '0206 | 2B | 0415 | | NOP | SWITCH POSITIONS |
| '0207 | 6A | 0416 | | LISL | 2 |
| '0208 | 66 | 0417 | | LISU | 6 |
| '0209 | 4D | 0418 | | LR | A,S |
| '020A | 2180 | 0419 | | NI | 080H |
| '020C | 8420 | 0420 | | BZ | TEET  CHECK OUTPUT ONLY WHILE ON |
| '020E | 6F | 0421 | | LISL | 7 |
| '020F | 67 | 0422 | | LISU | 7 |
| '0210 | 4D | 0423 | | LR | A,S |
| '0211 | 2400 | 0424 | | AI | 00H |
| '0213 | 9415 | 0425 | | BNZ | LOFA  IGNORE FIRST OUTPUT SIGNAL |
| '0215 | 6E | 0426 | | LISL | 6 |
| '0216 | 62 | 0427 | | LISU | 2 |
| '0217 | 4A | 0428 | | LR | A,10 |
| '0218 | 2B | 0429 | | NOP | |
| '0219 | 2140 | 0430 | | NI | 040H |
| '021B | 13 | 0431 | | SL | 1   LUBE OUTPUT CHECK |
| '021C | 2B | 0432 | | NOP | |
| '021D | CC | 0433 | | AS | S |
| '021E | 6C | 0434 | | LISL | 4 |
| '021F | 63 | 0435 | | LISU | 3 |
| '0220 | 840B | 0436 | | BZ | LOFA |
| '0222 | 8206 | 0437 | | BC | LOFA |
| '0224 | 20FF | 0438 | | LI | 0FFH |
| '0226 | 5D | 0439 | | LR | S,A |
| '0227 | 9005 | 0440 | | BR | TEET |
| '0229 | 70 | 0441 | LOFA | CLR | |
| '022A | 6E | 0442 | | LISL | 7 |
| '022B | 67 | 0443 | | LISU | 7 |
| '022C | 5C | 0444 | | LR | S,A |
| '022D | 69 | 0445 | TEET | LISL | 1 |
| '022E | 63 | 0446 | | LISU | 3 |
| '022F | 4A | 0447 | | LR | A,10 |
| '0230 | 2B | 0448 | | NOP | |

| | | | | | | |
|---|---|---|---|---|---|---|
| 0231 | 2110 | 0449 | | NI | 10H | |
| 0233 | 8404 | 0450 | | BZ | TWID | |
| 0235 | 20FF | 0451 | | LI | 0FFH | |
| 0237 | 5C | 0452 | | LR | S,A | MANUAL RUN |
| 0238 | 6E | 0453 | TWID | LISL | 6 | |
| 0239 | 62 | 0454 | | LISU | 2 | |
| 023A | 70 | 0455 | | CLR | | |
| 023B | 5C | 0456 | | LR | S,A | CLR LUBE CHECK SCRATCHPAD |
| 023C | 2B | 0457 | | NOP | | |
| 023D | 2B | 0458 | | NOP | | HIGH PRESSURE SW CHECK |
| 023E | 6F | 0459 | | LISL | 7 | |
| 023F | 66 | 0460 | | LISU | 6 | |
| 0240 | 4C | 0461 | | LR | A,S | |
| 0241 | 13 | 0462 | | SL | 1 | |
| 0242 | 5C | 0463 | | LR | S,A | |
| 0243 | 4A | 0464 | | LR | A,10 | |
| 0244 | 2101 | 0465 | | NI | 1 | |
| 0246 | 8404 | 0466 | | BZ | ICA1 | |
| 0248 | 4C | 0467 | | LR | A,S | |
| 0249 | 1F | 0468 | | INC | | |
| 024A | 5C | 0469 | | LR | S,A | |
| 024B | 4C | 0470 | ICA1 | LR | A,S | |
| 024C | 2103 | 0471 | | NI | 3 | |
| 024E | 2501 | 0472 | | CI | 1 | |
| 0250 | 68 | 0473 | | LISL | 0 | |
| 0251 | 67 | 0474 | | LISU | 7 | |
| 0252 | 9405 | 0475 | | BNZ | ICA2 | |
| 0254 | 71 | 0476 | | LIS | 1 | |
| 0255 | 5C | 0477 | | LR | S,A | |
| 0256 | 9004 | 0478 | | BR | SKIP | |
| 0258 | 70 | 0479 | ICA2 | CLR | | |
| 0259 | 5C | 0480 | | LR | S,A | |
| 025A | 2B | 0481 | | NOP | | LOW LEVEL SWITCH CHECK |
| 025B | 69 | 0482 | SKIP | LISL | 1 | |
| 025C | 67 | 0483 | | LISU | 7 | |
| 025D | 4C | 0484 | | LR | A,S | |
| 025E | 13 | 0485 | | SL | 1 | |
| 025F | 5C | 0486 | | LR | S,A | |
| 0260 | 4A | 0487 | | LR | A,10 | |
| 0261 | 2102 | 0488 | | NI | 2 | |
| 0263 | 8404 | 0489 | | BZ | ICB1 | |
| 0265 | 4C | 0490 | | LR | A,S | |
| 0266 | 1F | 0491 | | INC | | |
| 0267 | 5C | 0492 | | LR | S,A | |
| 0268 | 4C | 0493 | ICB1 | LR | A,S | |
| 0269 | 2103 | 0494 | | NI | 3 | |
| 026B | 2501 | 0495 | | CI | 1 | |
| 026D | 6A | 0496 | | LISL | 2 | |
| 026E | 67 | 0497 | | LISU | 7 | |
| 026F | 9405 | 0498 | | BNZ | ICB2 | |
| 0271 | 71 | 0499 | | LIS | 1 | |
| 0272 | 5C | 0500 | | LR | S,A | |
| 0273 | 9003 | 0501 | | BR | SKIP | |
| 0275 | 70 | 0502 | ICB2 | CLR | | |
| 0276 | 5C | 0503 | | LR | S,A | |
| 0277 | 2B | 0504 | SKIP | NOP | | CYCLE SWITCH CHECK |
| 0278 | 6D | 0505 | | LISL | 5 | |
| 0279 | 64 | 0506 | | LISU | 4 | |
| 027A | 4C | 0507 | | LR | A,S | |
| 027B | 13 | 0508 | | SL | 1 | |
| 027C | 5C | 0509 | | LR | S,A | |
| 027D | 4A | 0510 | | LR | A,10 | |
| 027E | 2108 | 0511 | | NI | 8 | |
| 0280 | 8404 | 0512 | | BZ | ICC1 | |

| | | | | | |
|---|---|---|---|---|---|
| '0282 | 4C | 0513 | | LR | A,S |
| '0283 | 1F | 0514 | | INC | |
| '0284 | 5C | 0515 | | LR | S,A |
| '0285 | 4C | 0516 | ICC1 | LR | A,S |
| '0286 | 2107 | 0517 | | NI | 7 |
| '0288 | 2504 | 0518 | | CI | 4 |
| '028A | 6E | 0519 | | LISL | 6 |
| '028B | 64 | 0520 | | LISU | 4 |
| '028C | 9405 | 0521 | | BNZ | ICC2 |
| '028E | 71 | 0522 | | LIS | 1 |
| '028F | 5C | 0523 | | LR | S,A |
| '0290 | 9003 | 0524 | | BR | IKK |
| '0292 | 70 | 0525 | ICC2 | CLR | |
| '0293 | 5C | 0526 | | LR | S,A |
| '0294 | 6F | 0527 | IKK | LISL | 7 | STROKE SW CHECK
| '0295 | 64 | 0528 | | LISU | 4 |
| '0296 | 2B | 0529 | | NOP | |
| '0297 | 4C | 0530 | | LR | A,S |
| '0298 | 13 | 0531 | | SL | 1 |
| '0299 | 5C | 0532 | | LR | S,A | THE ABOVE CHECKS OUT
| '029A | 4A | 0533 | | LR | A,10 | EVERY 16.6 MILLISECS
| '029B | 2104 | 0534 | | NI | 4 |
| '029D | 8404 | 0535 | | BZ | ICD1 |
| '029F | 4C | 0536 | | LR | A,S |
| '02A0 | 1F | 0537 | | INC | |
| '02A1 | 5C | 0538 | | LR | S,A |
| '02A2 | 4C | 0539 | ICD1 | LR | A,S |
| '02A3 | 2103 | 0540 | | NI | 3 |
| '02A5 | 2501 | 0541 | | CI | 1 |
| '02A7 | 68 | 0542 | | LISL | 0 |
| '02A8 | 65 | 0543 | | LISU | 5 |
| '02A9 | 9405 | 0544 | | BNZ | ICD2 |
| '02AB | 71 | 0545 | | LIS | 1 |
| '02AC | 5C | 0546 | | LR | S,A |
| '02AD | 9003 | 0547 | | BR | ICC |
| '02AF | 70 | 0548 | ICD2 | CLR | |
| '02B0 | 5C | 0549 | | LR | S,A |
| '02B1 | 69 | 0550 | ICC | LISL | 1 |
| '02B2 | 63 | 0551 | | LISU | 3 |
| '02B3 | A5 | 0552 | | INS | 5 |
| '02B4 | 2B | 0553 | | NOP | |
| '02B5 | 2110 | 0554 | | NI | 010H |
| '02B7 | 8404 | 0555 | | BZ | GOUF |
| '02B9 | 20FF | 0556 | | LI | 0FFH |
| '02BB | 5C | 0557 | | LR | S,A | MANUAL RUN
| '02BC | 2B | 0558 | GOUF | NOP | |
| '02BD | 45 | 0559 | | LR | A,5 | R5: ROUTINE REGISTER
| '02BE | 2180 | 0560 | | NI | 80H | 1-STROKE PROGRAMMED
| '02C0 | 840A | 0561 | | BZ | PII | 0-TIME PROGRAMMED
| '02C2 | 68 | 0562 | | LISL | 0 |
| '02C3 | 65 | 0563 | | LISU | 5 |
| '02C4 | 4C | 0564 | | LR | A,S |
| '02C5 | 2400 | 0565 | | AI | 0 | STROKE TRANSISTION OCCUR
| '02C7 | 8479 | 0566 | | BZ | PNO |
| '02C9 | 9411 | 0567 | | BNZ | PSTR |
| '02CB | 6E | 0568 | PII | LISL | 6 |
| '02CC | 63 | 0569 | | LISU | 3 | DECREMENT HERTZ
| '02CD | 3C | 0570 | | DS | S |
| '02CE | 9472 | 0571 | | BNZ | PNO |
| '02D0 | 6E | 0572 | | LISL | 6 |
| '02D1 | 66 | 0573 | | LISU | 6 | LOAD FREQUENCY
| '02D2 | 4C | 0574 | | LR | A,S |
| '02D3 | 6E | 0575 | | LISL | 6 |
| '02D4 | 63 | 0576 | | LISU | 3 |
| '02D5 | 5D | 0577 | | LR | I,A |
| '02D6 | 3C | 0578 | | DS | S |
| '02D7 | 9469 | 0579 | | BNZ | PNO | ISAR NOW R37
| '02D9 | 76 | 0580 | | LIS | 06H |

| | | | | | |
|---|---|---|---|---|---|
| '02DA | 5C | 0581 | LR | S,A | |
| '02DB | 68 | 0582 PSTR | LISL | 0 | |
| '02DC | 64 | 0583 | LISU | 4 | |
| '02DD | 20FF | 0584 | LI | 0FFH | DECIMAL DECREMENT |
| '02DF | UC | 0585 | ASD | S | |
| '02E0 | 5C | 0586 | LR | S,A | |
| '02E1 | 2400 | 0587 | AI | 00H | |
| '02E3 | 945D | 0588 | BNZ | PNO | |
| '02E5 | 40 | 0589 | LR | A,0 | |
| '02E6 | 50 | 0590 | LR | I,A | ISAR IS OCTAL 41, DEC 33 |
| '02E7 | 4C | 0591 | LR | A,S | |
| '02E8 | 2400 | 0592 | AI | 0 | |
| '02EA | 8434 | 0593 | BZ | PYES | |
| '02EC | 6C | 0594 | LISL | 4 | |
| '02ED | 3C | 0595 | DS | S | |
| '02EE | 9452 | 0596 | BNZ | PNO | |
| '02F0 | 200A | 0597 | LI | 0AH | |
| '02F2 | 5C | 0598 | LR | S,A | |
| '02F3 | 69 | 0599 | LISL | 1 | |
| '02F4 | 4C | 0600 | LR | A,S | |
| '02F5 | 24FF | 0601 | AI | 0FFH | PROG MULT OF 1 |
| '02F7 | 8127 | 0602 | BZ | PYES | |
| '02F9 | 6B | 0603 | LISL | 3 | |
| '02FA | 3C | 0604 | DS | S | |
| '02FB | 9445 | 0605 | BNZ | PNO | |
| '02FD | 200A | 0606 | LI | 0AH | |
| '02FF | 5C | 0607 | LR | S,A | |
| '0300 | 69 | 0608 | LISL | 1 | |
| '0301 | 4C | 0609 | LR | A,S | |
| '0302 | 24FF | 0610 | AI | 0FEH | PROG MULT OF 2 |
| '0304 | 841A | 0611 | BZ | PYES | |
| '0306 | 6A | 0612 | LISL | 2 | |
| '0307 | 3C | 0613 | DS | S | |
| '0308 | 9433 | 0614 | BNZ | PNO | |
| '030A | 200A | 0615 | LI | 0AH | |
| '030C | 5C | 0616 | LR | S,A | |
| '030D | 2B | 0617 | NOP | | |
| '030E | 2B | 0618 | NOP | | |
| '030F | 2B | 0619 | NOP | | |
| '0310 | 2B | 0620 | NOP | | |
| '0311 | 2B | 0621 | NOP | | |
| '0312 | 2B | 0622 | NOP | | |
| '0313 | 2B | 0623 | NOP | | |
| '0314 | 2B | 0624 | NOP | | |
| '0315 | 2B | 0625 | NOP | | |
| '0316 | 2B | 0626 | NOP | | |
| '0317 | 2B | 0627 | NOP | | |
| '0318 | 2B | 0628 | NOP | | |
| '0319 | 2B | 0629 | NOP | | |
| '031A | 2B | 0630 | NOP | | |
| '031B | 2B | 0631 | NOP | | |
| '031C | 2B | 0632 | NOP | | |
| '031D | 2B | 0633 | NOP | | |
| '031E | 2B | 0634 | NOP | | |
| '031F | 68 | 0635 PYES | LISL | 0 | PROGRAM IS 0 FLAG |
| '0320 | 63 | 0636 | LISU | 3 | |
| '0321 | 20FF | 0637 | LI | 0FFH | |
| '0323 | 5C | 0638 | LR | S,A | |
| '0324 | 6D | 0639 | LISL | 5 | ENABLE MONITOR |
| '0325 | 67 | 0640 | LISU | 7 | |
| '0326 | 4C | 0641 | LR | A,S | |
| '0327 | 2400 | 0642 | AI | 00H | |
| '0329 | 8406 | 0643 | BZ | KLIT | |
| '032B | 6B | 0644 | LISL | 3 | |

| | | | | | |
|---|---|---|---|---|---|
| '032C | 67 | 0645 | LISU | 7 | |
| '032D | 20FF | 0646 | LI | 0FFH | |
| '032F | 5C | 0647 | LR | S,A | |
| '0330 | 60 | 0648 KLIT | LISL | 5 | |
| '0331 | 20FF | 0649 | LI | 0FFH | |
| '0333 | 5C | 0650 | LR | S,A | |
| '0334 | 29034F | A 0651 | JMP | ZBA | CYC NOT COMPLETE, TERMINATE T-S, S-T PROG FAULT FLAG |
| '0337 | 68 | 0652 PNMO | LISL | 3 | |
| '0338 | 67 | 0653 | LISU | 7 | |
| '0339 | 20FF | 0654 | LI | 0FFH | |
| '033B | 5C | 0655 | LR | S,A | |
| '033C | 29034F | A 0656 | JMP | ZBA | |
| '033F | 2B | 0657 | NOP | | |
| '0340 | 2B | 0658 | NOP | | |
| '0341 | 68 | 0659 PNO | LISL | 0 | |
| '0342 | 63 | 0660 | LISU | 3 | |
| '0343 | 70 | 0661 | CLR | | |
| '0344 | 5C | 0662 | LR | S,A | |
| '0345 | 6D | 0663 | LISL | 5 | |
| '0346 | 67 | 0664 | LISU | 7 | |
| '0347 | 2400 | 0665 | AI | 0 | |
| '0349 | 4C | 0666 | LR | A,S | |
| '034A | 2400 | 0667 | AI | 0 | |
| '034C | 8445 | 0668 | BZ | MNO | |
| '034E | 2B | 0669 | NOP | | |
| '034F | 2B | 0670 ZBA | NOP | | |
| '0350 | 45 | 0671 | LR | A,5 | R5 IS ROUTINE REGISTER |
| '0351 | 2110 | 0672 | NI | 10H | |
| '0353 | 840A | 0673 | BZ | MTT | |
| '0355 | 68 | 0674 | LISL | 0 | |
| '0356 | 65 | 0675 | LISU | 5 | STROKE TRANSISTION??? |
| '0357 | 4C | 0676 | LR | A,S | |
| '0358 | 2400 | 0677 | AI | 0 | |
| '035A | 8437 | 0678 | BZ | MNO | |
| '035C | 9412 | 0679 | BNZ | MSTK | |
| '035E | 69 | 0680 MTT | LISL | 1 | |
| '035F | 65 | 0681 | LISU | 5 | |
| '0360 | 3C | 0682 | DS | S | |
| '0361 | 9430 | 0683 | BNZ | MNO | |
| '0363 | 6E | 0684 | LISL | 6 | |
| '0364 | 66 | 0685 | LISU | 6 | |
| '0365 | 4C | 0686 | LR | A,S | |
| '0366 | 69 | 0687 | LISL | 1 | |
| '0367 | 65 | 0688 | LISU | 5 | |
| '0368 | 50 | 0689 | LR | 1,A | |
| '0369 | 3C | 0690 | DS | S | |
| '036A | 9427 | 0691 | BNZ | MNO | |
| '036C | 76 | 0692 | LIS | 6H | |
| '036D | 5C | 0693 | LR | S,A | |
| '036E | 2B | 0694 | NOP | | |
| '036F | 6B | 0695 MSTK | LISL | 3 | |
| '0370 | 65 | 0696 | LISU | 5 | |
| '0371 | 20FF | 0697 | LI | 0FFH | |
| '0373 | DC | 0698 | ASD | S | |
| '0374 | 5C | 0699 | LR | S,A | |
| '0375 | 2400 | 0700 | AI | 00H | DECIMAL DECREMENT |
| '0377 | 941A | 0701 | BNZ | MNO | |
| '0379 | 41 | 0702 | LR | A,1 | |
| '037A | 5C | 0703 | LR | S,A | |
| '037B | 6C | 0704 | LISL | 4 | |
| '037C | 65 | 0705 | LISU | 5 | |
| '037D | 4D | 0706 | LR | A,I | |
| '037E | 2400 | 0707 | AI | 0 | |
| '0380 | 8408 | 0708 | BZ | MYES | |

| | | | | | |
|---|---|---|---|---|---|
| '0382 | 3C | 0709 | | LS | S |
| '0383 | 940E | 0710 | | BNZ | MNU |
| '0385 | 200A | 0711 | | LI | 0AH |
| '0387 | 2B | 0712 | | NOP | |
| '0388 | 5C | 0713 | | LR | S,A |
| '0389 | 60 | 0714 | MYES | LISL | S       MUN EN IS 0 |
| '038A | 67 | 0715 | | LISU | 7 |
| '038B | 2000 | 0716 | | LI | 0 |
| '038D | 5C | 0717 | | LR | S,A |
| '038E | 6A | 0718 | | LISL | 2 |
| '038F | 62 | 0719 | | LISU | 2 |
| '0390 | 70 | 0720 | | CLR | |
| '0391 | 5C | 0721 | | LR | S,A   CLR MANRUN REG FOR PROG LO |
| '0392 | 69 | 0722 | MNU | LISL | 1 |
| '0393 | 63 | 0723 | | LISU | 3 |
| '0394 | AS | 0724 | | INS | 5 |
| '0395 | 2B | 0725 | | NOP | |
| '0396 | 2110 | 0726 | | NI | 010H |
| '0398 | 8404 | 0727 | | BZ | BLISS |
| '039A | 20FF | 0728 | | LI | 0FFH |
| '039C | 5C | 0729 | | LR | S,A   MANUAL RUN |
| '039D | 6A | 0730 | BLUSS | LISL | 2 |
| '039E | 66 | 0731 | | LISU | 6 |
| '039F | 4C | 0732 | | LR | A,S |
| '03A0 | 2104 | 0733 | | NI | 04H |
| '03A2 | 8445 | 0734 | | BZ | FUNF |
| '03A4 | 6B | 0735 | SIS | LISL | 3   CYCLE COUNT |
| '03A5 | 66 | 0736 | | LISU | 6 |
| '03A6 | 4C | 0737 | | LR | A,S |
| '03A7 | 2400 | 0738 | | AI | 00 |
| '03A9 | 8422 | 0739 | | BZ | EIN |
| '03AB | 6E | 0740 | | LISL | 6 |
| '03AC | 64 | 0741 | | LISU | 4 |
| '03AD | 4C | 0742 | | LR | A,S |
| '03AE | 2400 | 0743 | | AI | 00 |
| '03B0 | 842F | 0744 | | BZ | URI |
| '03B2 | 70 | 0745 | | CLR | |
| '03B3 | 5C | 0746 | | LR | S,A |
| '03B4 | 6B | 0747 | | LISL | 3 |
| '03B5 | 66 | 0748 | | LISU | 6 |
| '03B6 | 20FF | 0749 | | LI | 0FFH |
| '03B8 | DC | 0750 | | ASD | S |
| '03B9 | 5C | 0751 | | LR | S,A |
| '03BA | 2400 | 0752 | | AI | 00 |
| '03BC | 9423 | 0753 | | BNZ | URI |
| '03BE | 70 | 0754 | | CLR | |
| '03BF | 6A | 0755 | | LISL | 2 |
| '03C0 | 66 | 0756 | | LISU | 6 |
| '03C1 | 4C | 0757 | | LR | A,S |
| '03C2 | 2108 | 0758 | | NI | 08H |
| '03C4 | 5C | 0759 | | LR | S,A |
| '03C5 | 70 | 0760 | | CLR | |
| '03C6 | 6B | 0761 | | LISL | 3 |
| '03C7 | 63 | 0762 | | LISU | 3 |
| '03C8 | 5C | 0763 | | LR | S,A |
| '03C9 | 290303 | A 0764 | | JMP | FIER |
| '03CC | 6E | 0765 | EIN | LISL | 6 |
| '03CD | 64 | 0766 | | LISU | 4 |
| '03CE | 4C | 0767 | | LR | A,S |
| '03CF | 2400 | 0768 | | AI | 00 |
| '03D1 | 8406 | 0769 | | BZ | FIER |
| '03D3 | 60 | 0770 | | LISL | S |
| '03D4 | 66 | 0771 | | LISU | 6 |
| '03D5 | 20FF | 0772 | | LI | 0FFH |

| | | | | | | |
|---|---|---|---|---|---|---|
| 03D7 | 5C | | 0773 | | LR | S,A |
| 03D8 | 6C | | 0774 FIER | | LISL | 4 |
| 03D9 | 66 | | 0775 | | LISU | 6 |
| 03DA | 20FF | | 0776 | | LI | 0FFH |
| 03DC | 5E | | 0777 | | LR | S,A |
| 03DD | 2903E8 | A | 0778 | | JMP | FINE |
| 03E0 | 6C | | 0779 DRJ | | LISL | 4 |
| 03E1 | 66 | | 0780 | | LISU | 6 |
| 03E2 | 70 | | 0781 | | CLR | |
| 03E3 | 5C | | 0782 | | LR | S,A |
| 03E4 | 2903F8 | A | 0783 | | JMP | AMBER |
| 03E7 | 2B | | 0784 | | NOP | |
| 03E8 | 6A | | 0785 FINE | | LISL | 2 |
| 03E9 | 62 | | 0786 | | LISU | 2 |
| 03EA | 70 | | 0787 | | CLR | |
| 03EB | 5C | | 0788 | | LR | S,A | CLR MANRUN REG FOR PROB LOC |
| 03EC | 6E | | 0789 | | LISL | 6 |
| 03ED | 64 | | 0790 | | LISU | 4 |
| 03EE | 4C | | 0791 | | LR | A,S |
| 03EF | 2400 | | 0792 | | AI | 00H |
| 03F1 | 8406 | | 0793 | | BZ | AMBER |
| 03F3 | 6D | | 0794 | | LISL | 5 |
| 03F4 | 66 | | 0795 | | LISU | 6 |
| 03F5 | 20FF | | 0796 | | LI | 0FFH |
| 03F7 | 5C | | 0797 | | LR | S,A |
| 03F8 | 2B | | 0798 AMBER | | NOP | |
| 03F9 | 6C | | 0799 | | LISL | 4 |
| 03FA | 67 | | 0800 | | LISU | 7 |
| 03FB | 4D | | 0801 | | LR | A,I |
| 03FC | 2400 | | 0802 | | AI | 00H |
| 03FE | 9404 | | 0803 | | BNZ | TPF0 |
| 0400 | 290406 | A | 0804 | | JMP | TPF1 |
| 0403 | 2905A2 | A | 0805 TPF0 | | JMP | TPF2 |
| 0406 | 2B | | 0806 TPF1 | | NOP | |
| 0407 | 6C | | 0807 TLLG | | LISL | 4 |
| 0408 | 66 | | 0808 | | LISU | 6 | R64 IS CYC COMPLETE FLAG |
| 0409 | 4C | | 0809 | | LR | A,S |
| 040A | 2400 | | 0810 | | AI | 00H |
| 040C | 8428 | | 0811 | | BZ | ZOO |
| 040E | 6D | | 0812 | | LISL | 5 |
| 040F | 67 | | 0813 | | LISU | 7 | R75 IS MON ENABLE FLAG |
| 0410 | 2400 | | 0814 | | AI | 00H |
| 0412 | 4C | | 0815 | | LR | A,S |
| 0413 | 2400 | | 0816 | | AI | 00H |
| 0415 | 9403 | | 0817 | | BNZ | TREE |
| 0417 | 70 | | 0818 | | CLR | |
| 0418 | 5C | | 0819 | | LR | S,A |
| 0419 | 6A | | 0820 TREE | | LISL | 2 |
| 041A | 66 | | 0821 | | LISU | 6 | R62 IS OUTPUT BUFFER |
| 041B | 4C | | 0822 | | LR | A,S |
| 041C | 2102 | | 0823 | | NI | 002H |
| 041E | 840A | | 0824 | | BZ | NORM | HAS FAULT NOT NORMAL |
| 0420 | 4C | | 0825 | | LR | A,S |
| 0421 | 21F7 | | 0826 | | NI | 0F7H |
| 0423 | 2B | | 0827 | | NOP | |
| 0424 | 2B | | 0828 | | NOP | |
| 0425 | 2B | | 0829 | | NOP | |
| 0426 | 5C | | 0830 | | LR | S,A |
| 0427 | 9062 | | 0831 | | BR | TOUT | CLR NORMAL STATE |
| 0429 | 4C | | 0832 NORM | | LR | A,S |
| 042A | 217B | | 0833 | | NI | 07BH |
| 042C | 2208 | | 0834 | | OI | 08H |
| 042E | 2B | | 0835 | | NOP | |
| 042F | 2B | | 0836 | | NOP | |

| | | | | | |
|---|---|---|---|---|---|
| 0430 | 2B | 0837 | | NOP | |
| 0431 | 5C | 0838 | | LR | S,A *NORMAL* |
| 0432 | 29048A | A 0839 | | JMP | TOUT |
| 0435 | 60 | 0840 | ZOO | LISL | 5 |
| 0436 | 67 | 0841 | | LISU | 7 |
| 0437 | 4C | 0842 | | LR | A,S |
| 0438 | 2400 | 0843 | | AI | 00H |
| 043A | 9414 | 0844 | | BNZ | TLUB *LUBE ROUTINE* |
| 043C | 6A | 0845 | PNM | LISL | 2 |
| 043D | 66 | 0846 | | LISU | 6 |
| 043E | 4C | 0847 | | LR | A,S |
| 043F | 2242 | 0848 | | OI | 042H |
| 0441 | 2173 | 0849 | | NI | 073H |
| 0443 | 5C | 0850 | | LR | S,A *STANDARD FAULT* |
| 0444 | 2B | 0851 | | NOP | |
| 0445 | 2B | 0852 | | NOP | |
| 0446 | 2B | 0853 | | NOP | |
| 0447 | 68 | 0854 | | LISL | 3 |
| 0448 | 63 | 0855 | | LISU | 3 |
| 0449 | 4C | 0856 | | LR | A,S |
| 044A | 2242 | 0857 | | OI | 042H |
| 044C | 5C | 0858 | | LR | S,A |
| 044D | 903C | 0859 | | BR | TOUT |
| 044F | 2B | 0860 | TLUB | NOP | |
| 0450 | 6A | 0861 | | LISL | 2 |
| 0451 | 66 | 0862 | | LISU | 6 |
| 0452 | 4C | 0863 | | LR | A,S |
| 0453 | 2284 | 0864 | | OI | 84H *LUBIND* |
| 0455 | 2B | 0865 | | NOP | |
| 0456 | 2B | 0866 | | NOP | |
| 0457 | 21F7 | 0867 | | NI | 0F7H |
| 0459 | 5C | 0868 | | LR | S,A |
| 045A | 46 | 0869 | | LR | A,6 |
| 045B | 2110 | 0870 | | NI | 010H |
| 045D | 2B | 0871 | | NOP | |
| 045E | 942B | 0872 | | BNZ | TOUT IF *NON-RECYCLE* |
| 0460 | 6F | 0873 | | LISL | 7 |
| 0461 | 65 | 0874 | | LISU | 5 |
| 0462 | 3C | 0875 | | DS | S |
| 0463 | 4C | 0876 | | LR | A,S |
| 0464 | 2400 | 0877 | | AI | 00H |
| 0466 | 9412 | 0878 | | BNZ | THZN |
| 0468 | 6E | 0879 | | LISL | 6 |
| 0469 | 66 | 0880 | | LISU | 6 |
| 046A | 4C | 0881 | | LR | A,S |
| 046B | 6F | 0882 | | LISL | 7 |
| 046C | 65 | 0883 | | LISU | 5 |
| 046D | 5E | 0884 | | LR | D,A |
| 046E | 3C | 0885 | | DS | S |
| 046F | 2B | 0886 | | NOP | |
| 0470 | 940B | 0887 | | BNZ | THZN |
| 0472 | 47 | 0888 | | LR | A,7 |
| 0473 | 5C | 0889 | | LR | S,A |
| 0474 | 68 | 0890 | | LISL | 0 |
| 0475 | 66 | 0891 | | LISU | 6 |
| 0476 | 4C | 0892 | | LR | A,S |
| 0477 | 18 | 0893 | | COM | |
| 0478 | 5C | 0894 | | LR | S,A |
| 0479 | 2B | 0895 | THZN | NOP | |
| 047A | 68 | 0896 | | LISL | 0 |
| 047B | 66 | 0897 | | LISU | 6 |
| 047C | 4C | 0898 | | LR | A,S |
| 047D | 2400 | 0899 | | AI | 00H |
| 047F | 6A | 0900 | | LISL | 2 |

| | | | | | |
|---|---|---|---|---|---|
| '0480 | 4C | 0901 | | LR | A,S |
| '0481 | 8405 | 0902 | | BZ | TOTF |
| '0483 | 21FF | 0903 | | NI | 0FFH | 3/8 SECONDS ON-LUBE OUTPUT
| '0485 | 9003 | 0904 | | BR | IOIN |
| '0487 | 217F | 0905 TOTF | | NI | 7FH | 3/8 SECONDS OFF-OUTPUT
| '0489 | 5C | 0906 IOIN | | LR | S,A |
| '048A | 2B | 0907 TOUT | | NOP | |
| '048B | 2B | 0908 | | NOP | |
| '048C | 2B | 0909 | | NOP | |
| '048D | 2B | 0910 | | NOP | |
| '048E | 2B | 0911 | | NOP | |
| '048F | 2B | 0912 | | NOP | |
| '0490 | 2B | 0913 | | NOP | |
| '0491 | 6D | 0914 | | LISL | 5 |
| '0492 | 67 | 0915 | | LISU | 7 |
| '0493 | 4C | 0916 | | LR | A,S |
| '0494 | 21FF | 0917 | | NI | 0FFH | SAFEGUARD
| '0496 | 6A | 0918 | | LISL | 2 |
| '0497 | 66 | 0919 | | LISU | 6 |
| '0498 | 9408 | 0920 | | BNZ | MOEN |
| '049A | 4C | 0921 | | LR | A,S |
| '049B | 217B | 0922 | | NI | 07BH |
| '049D | 2B | 0923 | | NOP | |
| '049E | 2B | 0924 | | NOP | |
| '049F | 2B | 0925 | | NOP | | IF NO MONITOR, CLEAR LUBE
| '04A0 | 5C | 0926 | | LR | S,A |
| '04A1 | 46 | 0927 MOLN | | LR | A,6 |
| '04A2 | 2104 | 0928 | | NI | 04H | SOLENOID FAILURE
| '04A4 | 8422 | 0929 | | BZ | SFO | FLOWCHART YZAC
| '04A6 | 6A | 0930 | | LISL | 2 |
| '04A7 | 66 | 0931 | | LISU | 6 |
| '04A8 | 4C | 0932 | | LR | A,S |
| '04A9 | 2101 | 0933 | | NI | 01H |
| '04AB | 9407 | 0934 | | BNZ | STH |
| '04AD | 6D | 0935 | | LISL | 5 |
| '04AE | 4C | 0936 | | LR | A,S |
| '04AF | 2400 | 0937 | | AI | 00H |
| '04B1 | 8410 | 0938 | | BZ | STW |
| '04B3 | 6A | 0939 STH | | LISL | 2 |
| '04B4 | 4C | 0940 | | LR | A,S |
| '04B5 | 2243 | 0941 | | OI | 43H |
| '04B7 | 21F7 | 0942 | | NI | 0F7H | CLR NORM STATE
| '04B9 | 5C | 0943 | | LR | S,A |
| '04BA | 68 | 0944 | | LISL | 3 |
| '04BB | 63 | 0945 | | LISU | 3 |
| '04BC | 4C | 0946 | | LR | A,S |
| '04BD | 2203 | 0947 | | OI | 03H |
| '04BF | 5C | 0948 | | LR | S,A |
| '04C0 | 9006 | 0949 | | BR | SFO |
| '04C2 | 6A | 0950 STW | | LISL | 2 |
| '04C3 | 4C | 0951 | | LR | A,S |
| '04C4 | 21FE | 0952 | | NI | 0EEH |
| '04C6 | 5C | 0953 | | LR | S,A |
| '04C7 | 46 | 0954 SFO | | LR | A,6 |
| '04C8 | 2102 | 0955 | | NI | 02H | LOW LEVEL
| '04CA | 942F | 0956 | | BNZ | LUN | FLOWCHART YZAU
| '04CC | 2B | 0957 | | NOP | |
| '04CD | 2B | 0958 | | NOP | |
| '04CE | 2B | 0959 | | NOP | |
| '04CF | 2B | 0960 | | NOP | |
| '04D0 | 2B | 0961 | | NOP | |
| '04D1 | 2B | 0962 | | NOP | |
| '04D2 | 2B | 0963 | | NOP | |
| '04D3 | 2B | 0964 | | NOP | |

| | | | | | |
|---|---|---|---|---|---|
| 04D4 | 69 | 0965 | | LISL | 1 |
| 04D5 | 67 | 0966 | | LISU | 7 |
| 04D6 | 4C | 0967 | | LR | A,S |
| 04D7 | 2104 | 0968 | | NI | 04H |
| 04D9 | 8435 | 0969 | | BZ | LFO |
| 04DB | 69 | 0970 | LTH | LISL | 1 |
| 04DC | 67 | 0971 | | LISU | 7 |
| 04DD | 4C | 0972 | | LR | A,S |
| 04DE | 2104 | 0973 | | NI | 04H |
| 04E0 | 6A | 0974 | | LISL | 2 |
| 04E1 | 66 | 0975 | | LISU | 6 |
| 04E2 | 9409 | 0976 | | BNZ | LFI |
| 04E4 | 4C | 0977 | | LR | A,S |
| 04E5 | 2242 | 0978 | | OI | 042H |
| 04E7 | 21F7 | 0979 | | NI | 0F7H |
| 04E9 | 5C | 0980 | | LR | S,A |
| 04EA | 9007 | 0981 | | BR | LSI |
| 04EC | 4C | 0982 | LFI | LR | A,S |
| 04ED | 2252 | 0983 | | OI | 052H |
| 04EF | 21F7 | 0984 | | NI | 0F7H |
| 04F1 | 5C | 0985 | | LR | S,A |
| 04F2 | 6B | 0986 | LSI | LISL | 3 |
| 04F3 | 63 | 0987 | | LISU | 3 |
| 04F4 | 4C | 0988 | | LR | A,S |
| 04F5 | 2212 | 0989 | | OI | 12H |
| 04F7 | 5C | 0990 | | LR | S,A |
| 04F8 | 9016 | 0991 | | BR | LFO |
| 04FA | 69 | 0992 | LON | LISL | 1 |
| 04FB | 67 | 0993 | | LISU | 7 |
| 04FC | 4C | 0994 | | LR | A,S |
| 04FD | 2104 | 0995 | | NI | 04H |
| 04FF | 8409 | 0996 | | BZ | LTW |
| 0501 | 6A | 0997 | | LISL | 2 |
| 0502 | 66 | 0998 | | LISU | 6 |
| 0503 | 4C | 0999 | | LR | A,S |
| 0504 | 2210 | 1000 | | OI | 10H |
| 0506 | 5C | 1001 | | LR | S,A |
| 0507 | 9007 | 1002 | | BR | LFO |
| 0509 | 6A | 1003 | LTW | LISL | 2 |
| 050A | 66 | 1004 | | LISU | 6 |
| 050B | 4C | 1005 | | LR | A,S |
| 050C | 21EF | 1006 | | NI | 0EFH |
| 050E | 5C | 1007 | | LR | S,A |
| 050F | 46 | 1008 | LFO | LR | A,6 | HIGH PRESSURE
| 0510 | 2101 | 1009 | | NI | 01H | FLOWCHART YZAE
| 0512 | 942F | 1010 | | BNZ | HON |
| 0514 | 2B | 1011 | | NOP | |
| 0515 | 2B | 1012 | | NOP | |
| 0516 | 2B | 1013 | | NOP | |
| 0517 | 2B | 1014 | | NOP | |
| 0518 | 2B | 1015 | | NOP | |
| 0519 | 2B | 1016 | | NOP | |
| 051A | 2B | 1017 | | NOP | |
| 051B | 2B | 1018 | | NOP | |
| 051C | 6F | 1019 | | LISL | 7 |
| 051D | 66 | 1020 | | LISU | 6 |
| 051E | 4C | 1021 | | LR | A,S |
| 051F | 2400 | 1022 | | AI | 00H |
| 0521 | 8435 | 1023 | | BZ | HFO |
| 0523 | 6F | 1024 | HTH | LISL | 7 |
| 0524 | 66 | 1025 | | LISU | 6 |
| 0525 | 4C | 1026 | | LR | A,S |
| 0526 | 2104 | 1027 | | NI | 04H |
| 0528 | 6A | 1028 | | LISL | 2 |

| | | | | | |
|---|---|---|---|---|---|
| '0529 | 66 | 1029 | | LISU | 6 |
| '052A | 9409 | 1030 | | BNZ | HFI |
| '052B | 4C | 1031 | | LR | A,S |
| '052D | 2242 | 1032 | | OI | 042H |
| '052F | 21F7 | 1033 | | NI | 0F7H |
| '0531 | 5C | 1034 | | LR | S,A |
| '0532 | 9007 | 1035 | | BR | HSI |
| '0534 | 4C | 1036 | HFI | LR | A,S |
| '0535 | 2262 | 1037 | | OI | 062H |
| '0537 | 21F7 | 1038 | | NI | 0F7H |
| '0539 | 5C | 1039 | | LR | S,A |
| '053A | 6B | 1040 | HSI | LISL | 3 |
| '053B | 63 | 1041 | | LISU | 3 |
| '053C | 4C | 1042 | | LR | A,S |
| '053D | 2222 | 1043 | | OI | 022H |
| '053F | 5C | 1044 | | LR | S,A |
| '0540 | 9016 | 1045 | | BR | HFO |
| '0542 | 6F | 1046 | HON | LISL | 7 |
| '0543 | 66 | 1047 | | LISU | 6 |
| '0544 | 4C | 1048 | | LR | A,S |
| '0545 | 2104 | 1049 | | NI | 04H |
| '0547 | 8409 | 1050 | | BZ | HTW |
| '0549 | 6A | 1051 | | LISL | 2 |
| '054A | 66 | 1052 | | LISU | 6 |
| '054B | 4C | 1053 | | LR | A,S |
| '054C | 2220 | 1054 | | OI | 020H |
| '054E | 5C | 1055 | | LR | S,A |
| '054F | 9007 | 1056 | | BR | HFO |
| '0551 | 6A | 1057 | HTW | LISL | 2 |
| '0552 | 66 | 1058 | | LISU | 6 |
| '0553 | 4C | 1059 | | LR | A,S |
| '0554 | 210F | 1060 | | NI | 00FH |
| '0556 | 5C | 1061 | | LR | S,A |
| '0557 | 46 | 1062 | HFO | LR | A,6 |
| '0558 | 2180 | 1063 | | NI | 080H |
| '055A | 8424 | 1064 | | BZ | BLON |
| '055C | 6B | 1065 | | LISL | 3 |
| '055D | 63 | 1066 | | LISU | 3 |
| '055E | 4C | 1067 | | LR | A,S |
| '055F | 21FD | 1068 | | NI | 0FDH |
| '0561 | 841D | 1069 | | BZ | BLON |
| '0563 | 4C | 1070 | | LR | A,S |
| '0564 | 2240 | 1071 | | OI | 040H |
| '0566 | 6A | 1072 | | LISL | 2 |
| '0567 | 66 | 1073 | | LISU | 6 |
| '0568 | 5C | 1074 | | LR | S,A |
| '0569 | 62 | 1075 | | LISU | 2 |
| '056A | 4C | 1076 | | LR | A,S |
| '056B | 2400 | 1077 | | AI | 00H |
| '056D | 8415 | 1078 | | BZ | ZLON |
| '056F | 66 | 1079 | | LISU | 6 |
| '0570 | 4C | 1080 | | LR | A,S |
| '0571 | 2284 | 1081 | | OI | 084H |
| '0573 | 5C | 1082 | | LR | S,A |
| '0574 | 2B | 1083 | | NOP | |
| '0575 | 2B | 1084 | | NOP | |
| '0576 | 2B | 1085 | | NOP | |
| '0577 | 2B | 1086 | | NOP | |
| '0578 | 2B | 1087 | | NOP | |
| '0579 | 5C | 1088 | | LR | S,A |
| '057A | 2B | 1089 | | NOP | |
| '057B | 2B | 1090 | | NOP | |
| '057C | 2B | 1091 | | NOP | |
| '057D | 9005 | 1092 | | BR | ZLON |

PROGRAM LOCKOUT FLOWCHART YZAF

| | | | | | |
|---|---|---|---|---|---|
| '057F | 6B | 1093 BLON | LISL | 3 | CLR R33 |
| '0580 | 63 | 1094 | LISU | 3 | NOT USED WITHOUT LOCKOUT |
| '0581 | 70 | 1095 | CLR | | |
| '0582 | 5C | 1096 | LR | S,A | |
| '0583 | 6B | 1097 2LON | LISL | 3 | |
| '0584 | 67 | 1098 | LISU | 7 | |
| '0585 | 4C | 1099 | LR | A,S | |
| '0586 | 2400 | 1100 | AI | 00H | |
| '0588 | 8432 | 1101 | BZ | SOUT | |
| '058A | 2B | 1102 | NOP | | *PROGRAMMING FAULT* |
| '058B | 2B | 1103 | NOP | | T/S, S/T |
| '058C | 6C | 1104 | LISL | 4 | |
| '058D | 62 | 1105 | LISU | 2 | |
| '058E | 4C | 1106 | LR | A,S | |
| '058F | 1F | 1107 | INC | | |
| '0590 | 5C | 1108 | LR | S,A | |
| '0591 | 2120 | 1109 | NI | 20H | 2 HERTZ FLIP-FLOP |
| '0593 | 6A | 1110 | LISL | 2 | |
| '0594 | 66 | 1111 | LISU | 6 | |
| '0595 | 8406 | 1112 | BZ | TPFY | |
| '0597 | 2046 | 1113 | LI | 046H | RED AND YELLOW LITES ON |
| '0599 | 5C | 1114 | LR | S,A | |
| '059A | 903F | 1115 | BR | LOUT | |
| '059C | 204A | 1116 TPFY | LI | 04AH | RED AND GREEN LITES ON |
| '059E | 5C | 1117 | LR | S,A | |
| '059F | 2905B8' A | 1118 | JMP | SOUT | |
| '05A2 | 6C | 1119 TPFZ | LISL | 4 | |
| '05A3 | 62 | 1120 | LISU | 2 | |
| '05A4 | 4C | 1121 | LR | A,S | *PROGRAMMING FAULT* |
| '05A5 | 1F | 1122 | INC | | T/T, S/S |
| '05A6 | 5C | 1123 | LR | S,A | OR ZERO SETTINGS |
| '05A7 | 2110 | 1124 | NI | 010H | |
| '05A9 | 6A | 1125 | LISL | 2 | |
| '05AA | 66 | 1126 | LISU | 6 | |
| '05AB | 8409 | 1127 | BZ | ZULU | |
| '05AD | 4C | 1128 | LR | A,S | |
| '05AE | 2173 | 1129 | NI | 073H | |
| '05B0 | 2242 | 1130 | OI | 042H | |
| '05B2 | 5C | 1131 | LR | S,A | |
| '05B3 | 9007 | 1132 | BR | SOUT | |
| '05B5 | 4C | 1133 ZULU | LR | A,S | |
| '05B6 | 217F | 1134 | NI | 07FH | |
| '05B8 | 224E | 1135 | OI | 04EH | |
| '05BA | 5C | 1136 | LR | S,A | |
| '05BB | 6C | 1137 SOUT | LISL | 4 | |
| '05BC | 63 | 1138 | LISU | 3 | |
| '05BD | 4C | 1139 | LR | A,S | |
| '05BE | 2400 | 1140 | AI | 00H | |
| '05C0 | 8419 | 1141 | BZ | LOUT | |
| '05C2 | 62 | 1142 | LISU | 2 | |
| '05C3 | 4C | 1143 | LR | A,S | *LUBE OUTPUT FAULT* |
| '05C4 | 1F | 1144 | INC | | |
| '05C5 | 5C | 1145 | LR | S,A | |
| '05C6 | 2108 | 1146 | NI | 08H | 2 HERTZ FLIP FLOP |
| '05C8 | 6A | 1147 | LISL | 2 | |
| '05C9 | 66 | 1148 | LISU | 6 | |
| '05CA | 4C | 1149 | LR | A,S | |
| '05CB | 8408 | 1150 | BZ | CIN | |
| '05CD | 2240 | 1151 | OI | 040H | |
| '05CF | 21F5 | 1152 | NI | 0F5H | |
| '05D1 | 5C | 1153 | LR | S,A | |
| '05D2 | 9006 | 1154 | BR | GLOP | |
| '05D4 | 2242 | 1155 CIN | OI | 042H | |
| '05D6 | 21F7 | 1156 | NI | 0F7H | |

| | | | | | | |
|---|---|---|---|---|---|---|
| '05D8 | 5C | | 1157 | | LR | S,A |
| '05D9 | 2B | | 1158 GLOP | NOP | | |
| '05DA | 2B | | 1159 LOUT | NOP | | |
| '05DB | 6D | | 1160 | | LISL | 5 |
| '05DC | 64 | | 1161 | | LISU | 4 |
| '05DD | 4C | | 1162 | | LR | A,S |
| '05DE | 2102 | | 1163 | | NI | 02H |
| '05E0 | 8407 | | 1164 | | BZ | CSIN |
| '05E2 | 2080 | | 1165 | | LI | 080H | CYCLE SWITCH ON |
| '05E4 | 2B | | 1166 | | NOP | |
| '05E5 | B1 | | 1167 | | OUTS | 1 |
| '05E6 | 9004 | | 1168 | | BR | QUAK |
| '05E8 | 70 | | 1169 CSIN | CLR | | |
| '05E9 | 2B | | 1170 | | NOP | |
| '05EA | B1 | | 1171 | | OUTS | 1 |
| '05EB | 46 | | 1172 QUAK | LR | A,6 |
| '05EC | 2108 | | 1173 | | NI | 08H | INV FAULT RELAY |
| '05EE | 8414 | | 1174 | | BZ | GOD |
| '05F0 | 6A | | 1175 | | LISL | 2 |
| '05F1 | 66 | | 1176 | | LISU | 6 |
| '05F2 | 4C | | 1177 | | LR | A,S |
| '05F3 | 2140 | | 1178 | | NI | 040H |
| '05F5 | 9407 | | 1179 | | BNZ | NAD |
| '05F7 | 4C | | 1180 | | LR | A,S |
| '05F8 | 2240 | | 1181 | | OI | 040H |
| '05FA | 2B | | 1182 | | NOP | |
| '05FB | 900A | | 1183 | | BR | CLEVE |
| '05FD | 4C | | 1184 NAD | LR | A,S |
| '05FE | 21BF | | 1185 | | NI | 0BFH |
| '0600 | 2B | | 1186 | | NOP | |
| '0601 | 9004 | | 1187 | | BR | CLEVE |
| '0603 | 6A | | 1188 GOD | LISL | 2 |
| '0604 | 66 | | 1189 | | LISU | 6 |
| '0605 | 4C | | 1190 | | LR | A,S |
| '0606 | 18 | | 1191 CLEVE | COM | | |
| '0607 | B4 | | 1192 | | OUTS | 4 | *******OUTPUTS******** |
| '0608 | 6A | | 1193 | | LISL | 2 |
| '0609 | 66 | | 1194 | | LISU | 6 |
| '060A | 4C | | 1195 | | LR | A,S |
| '060B | 2180 | | 1196 | | NI | 080H |
| '060D | 6E | | 1197 | | LISL | 6 |
| '060E | 62 | | 1198 | | LISU | 2 | LUBE CHECKING /SEE ABOVE/ |
| '060F | 5C | | 1199 | | LR | S,A |
| '0610 | 2B | | 1200 | | NOP | |
| '0611 | 69 | | 1201 | | LISL | 1 |
| '0612 | 63 | | 1202 | | LISU | 3 |
| '0613 | 4C | | 1203 | | LR | A,S |
| '0614 | 2400 | | 1204 | | AI | 00H |
| '0616 | 8404 | | 1205 | | BZ | SACO | *NO MAN RUN* |
| '0618 | 29004B | A | 1206 | | JMP | FIT1 | *MAN RUN* |
| '061B | 2B | | 1207 SACO | NOP | | |
| '061C | 68 | | 1208 | | LISL | 0 |
| '061D | 63 | | 1209 | | LISU | 3 |
| '061E | 4C | | 1210 | | LR | A,S |
| '061F | 2400 | | 1211 | | AI | 00H |
| '0621 | 8404 | | 1212 | | BZ | OCAS |
| '0623 | 290067 | A | 1213 | | JMP | BGN | PROG IS 0 |
| '0626 | 290099 | A | 1214 OCAS | JMP | WAIT |
| '0629 | 2B | | 1215 | | NOP | |
| '062A | 2B | | 1216 | | NOP | |

I claim as my invention:

1. A system for control of a lubrication system for an operating apparatus which requires lubrication, responsive to conditions of the lubrication system, a micro-computer connected to receive an output of said means responsive to conditions of the lubrication system and connected to said lubrication system to operate it, a means for setting parameters of said lubrication system connected to supply inputs to said micro-computer, a machine control means connected to the output of said micro-computer and connected to said operating apparatus to stop it so as to prevent machine damage, and wherein said means for setting parameters of said lubrication system comprises program, system cycle, monitor, and control switch means for allowing different programs for the lubrication system to be selected.

2. A system for control of a lubrication system according to claim 1 wherein said means responsive to conditions of the lubrication system includes a reservoir lubricant level sensor.

3. A system for control of a lubrication system according to claim 1 wherein said means responsive to conditions of the lubrication system includes a lubricant pressure sensor.

4. A system for control of a lubrication system according to claim 1 further including means responsive to conditions of said operating apparatus connected to supply an output to said micro-computer.

5. A system for control of a lubrication system according to claim 1 wherein said control switch means includes a range switch means which can be arranged to select a particular time interval for lubrication.

6. A system for control of a lubrication system according to claim 1 wherein said control switch means includes a range switch means which can be arranged to select the number of machine strokes of said operating apparatus between lubrication cycles.

7. A system for control of a lubrication system according to claim 6 wherein said control switch means for setting parameters of said lubrication system further comprises a system cycle switch means which allows the frequency of repetition that a lubrication program is exercised during a preselected monitor interval to be varied.

8. A system for control of a lubrication system according to claim 1 wherein said control switch means further includes a monitor range switch means that can be set to a selected time interval.

9. A system for control of a lubrication system according to claim 1 wherein said control switch means further includes a monitor range switch means that can be set to a number of machine strokes of said output apparatus.

10. A system for control of a lubrication system according to claim 1 wherein said means for setting parameters of said lubrication system comprising a control switch means for selecting conditions such as time or stroke.

11. A system for control of a lubrication system according to claim 10 wherein said control switch means includes a program lock-out switch which when closed causes the operating machine to stop.

12. A system for control of a lubrication system according to claim 10 wherein said control switch means includes a prelube switch which when closed causes said control for a lubrication system to initiate a lube upon application of power and when said switch is open causes said control for a lubrication system to wait for one program cycle after the operating machine is turned on before initiating a lube.

13. A system for control of a lubrication system according to claim 10 wherein said control switch means includes a frequency switch for setting a frequency clock so it responds to either 50 or 60 cycle line frequency and also includes a power switch for allowing operation from 110 or 220 volt power supplies.

14. A system for control of a lubrication system according to claim 10 wherein said control switch means includes a switch which can be closed so that when a low lubricant fluid level condition occurs said switch will supply an output to said machine control means to control said operating apparatus so as to prevent machine damage.

15. A system for control of a lubrication system according to claim 10 wherein said control switch means includes a switch which can be closed so that when a high lubricant pressure condition occurs said switch will supply an output to said machine control means to control said operating apparatus so as to prevent machine damage.

* * * * *

UNITED STATES PATENT AND TRADEMARK OFFICE
CERTIFICATE OF CORRECTION

PATENT NO. : 4,445,168
DATED : April 24, 1984
INVENTOR(S) : William W. Petryszyn It is certified that error appears in the above—identified patent and that said Letters Patent is hereby corrected as shown below:

Column 1, line 17, "present time" should read

--preset times--.

Signed and Sealed this

Second Day of April 1985

[SEAL]

Attest:

DONALD J. QUIGG

Attesting Officer       Acting Commissioner of Patents and Trademarks